(12) United States Patent
Mcgregor et al.

(10) Patent No.: US 11,318,616 B2
(45) Date of Patent: May 3, 2022

(54) ROBOTIC DIGITAL TWIN CONTROL WITH INDUSTRIAL CONTEXT SIMULATION

(71) Applicant: Rockwell Automation Technologies, Inc., Mayfield Heights, OH (US)

(72) Inventors: Ian Mcgregor, Shepperton (GB); Adam Davidson, Reading (GB); David Dawkins, Reading (GB)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 74 days.

(21) Appl. No.: 16/679,522

(22) Filed: Nov. 11, 2019

(65) Prior Publication Data

US 2021/0138651 A1   May 13, 2021

(51) Int. Cl.
*B25J 9/16*   (2006.01)
*G06F 30/20*   (2020.01)
*G06F 111/20*   (2020.01)

(52) U.S. Cl.
CPC ............ *B25J 9/1671* (2013.01); *G06F 30/20* (2020.01); *G06F 2111/20* (2020.01)

(58) Field of Classification Search
CPC ............... B65F 2230/14; B81C 99/006; G05B 2219/50391; G05B 2219/50393;
(Continued)

(56) References Cited

U.S. PATENT DOCUMENTS 9,989,958 B2 * 6/2018 Asenjo ............... G05B 19/4185
10,318,904 B2   6/2019 Johnson et al.
(Continued)

FOREIGN PATENT DOCUMENTS

EP   2 871 540 A2   5/2015
EP   3 318 944 A2   5/2018
(Continued)

OTHER PUBLICATIONS

Beier. "Web-Based Virtual Reality in Design and Manufacturing Applications". 1st International EuroConference on Computer Applications and Information Technology in the Maritime Industries. 2000. 11 Pages. (Year: 2000).*
(Continued)

*Primary Examiner* — Eunhee Kim
(74) *Attorney, Agent, or Firm* — Amin, Turocy & Watson, LLP

(57) ABSTRACT

An industrial control design and testing system allows vendor-specific digital twins of industrial robots to be imported into a vendor-agnostic simulation platform so that coordinated operation of the robots within the context of a larger automation system can be simulated and observed. Rather than requiring a designer to re-write the robot program in a format understandable by the simulation system, the design and testing system can link to instances of the vendor-specific robot simulation platforms to facilitate execution of the actual robot programs that will be installed and executed on the corresponding physical robots. This accurately simulates operation of the robots in a manner that requires less development work on the part of the designer and allows the robot's surrounding environment to be modeled and simulated more accurately than would be the case using a simulation platform specific to a particular robot vendor.

20 Claims, 16 Drawing Sheets

(58) Field of Classification Search
CPC ........... G05B 2219/40316; G05B 2219/40478; G05B 2219/40479; H01H 2231/04; G06F 2111/20; B25J 9/1671; B25J 9/16; B25J 9/1679

See application file for complete search history.

(56) References Cited

U.S. PATENT DOCUMENTS

| | | | | |
|---|---|---|---|---|
| 10,596,704 | B1* | 3/2020 | Ramanujam | ........... B25J 9/1671 |
| 10,678,233 | B2 | 6/2020 | Cella et al. | |
| 10,996,642 | B2 | 5/2021 | Wang et al. | |
| 2009/0089030 | A1* | 4/2009 | Sturrock | ................ G05B 17/02 703/7 |
| 2009/0089031 | A1 | 4/2009 | Sturrock et al. | |
| 2009/0319058 | A1 | 12/2009 | Rovaglio et al. | |
| 2013/0204587 | A1 | 8/2013 | Cheng et al. | |
| 2013/0275091 | A1* | 10/2013 | Peterson | ................ G06F 30/20 703/1 |
| 2014/0180644 | A1 | 6/2014 | Maturana et al. | |
| 2015/0134313 | A1* | 5/2015 | Maturana | ............... G05B 17/02 703/6 |
| 2015/0277406 | A1* | 10/2015 | Maturana | ............... G05B 17/02 700/83 |
| 2016/0182309 | A1* | 6/2016 | Maturana | ................ G06F 30/20 709/224 |
| 2017/0025040 | A1* | 1/2017 | Maturana | ............... G05B 17/02 |
| 2017/0053047 | A1 | 2/2017 | Mcdaniel | |
| 2019/0221037 | A1* | 7/2019 | Sugaya | ................ G06T 19/003 |
| 2020/0012265 | A1 | 1/2020 | Thomsen et al. | |
| 2020/0034501 | A1 | 1/2020 | Duff et al. | |

FOREIGN PATENT DOCUMENTS

| | | |
|---|---|---|
| EP | 3 798 775 A1 | 3/2021 |
| WO | 2016/053337 A1 | 4/2016 |

OTHER PUBLICATIONS

Extended European Search Report received for EP Patent Application Serial No. 21156811.8 dated Jul. 15, 2021, 11 pages.
Communication Pursuant to Rule 69 EPC received for EP Patent Application Serial No. 21156811.8 dated Aug. 23, 2021, 2 pages.
Non-Final Office Action received for U.S. Appl. No. 16/679,503 dated Aug. 3, 2021, 136 pages.
Negri et al., "A review of the roles of digital twin in CPS-based production systems", 27th International Conference on Flexible Automation and Intelligent Manufacturing, Procedia Manufacturing, vol. 11, Jun. 27-30, 2017, pp. 939-948.
Luo et al., "MIDAS: Multidisciplinary interactive design and analysis system-integration of ASTROS and I-DEAS", 37th Structure, Structural Dynamics and Materials Conference, 1996, 16 pages.
Dominik et al., "Towards a Digital Twin: How the Blockchain can Foster E/E-Traceability in Consideration of Model-Based Systems Engineering", DS 87-3 Proceedings of the 21st International Conference on Engineering Design, vol. 3: Product, Services and Systems Design, Aug. 21-25, 2017, pp. 321-330.
Jakob et al., "Virtual Commissioning and construction of a digital twin for Smarta Fabriker", Chalmers, 2018, 36 pages.
Warmefjord et al., "Inspection Data to Support a Digital Twin for Geometry Assurance", ASME International Mechanical Engineering Congress and Exposition, vol. 58356, Nov. 3-9, 2017, pp. 1-10.
Non-Final Office Action received for U.S. Appl. No. 17/034,688 dated Sep. 13, 2021, 49 pages.
Extended European Search Report received for European Patent Application Serial No. 20204067.1 dated Mar. 24, 2021, 09 pages.
Dahmen et al., "Experimentable Digital Twins for a Modeling and Simulation-based Engineering Approach", IEEE International Systems, XP033456884, DOI: 10.1109/SYSENG.2018.8544383, Oct. 1, 2018, 08 pages.
Extended European Search Report received for European Patent Application Serial No. 20204528.2 dated Apr. 6, 2021, 10 pages.
Extended European Search Report received for EP Patent Application Serial No. 21186087.9 dated Jan. 5, 2022, 13 pages.
Final Office Action received for U.S. Appl. No. 16/679,503 dated Dec. 13, 2021, 59 pages.
Final Office Action received for U.S. Appl. No. 17/034,688 dated Jan. 7, 2022, 81 pages.

\* cited by examiner

US 11,318,616 B2

ROBOTIC DIGITAL TWIN CONTROL WITH INDUSTRIAL CONTEXT SIMULATION

BACKGROUND

The subject matter disclosed herein relates generally to industrial automation systems, and, more specifically, to simulation of industrial automation systems.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for simulating automation systems is provided, comprising a simulation component configured to execute of a simulation of an industrial automation system based on a three-dimensional virtual model of the industrial automation system, the three-dimensional virtual model including a virtual robot model representing an industrial robot to be included in the industrial automation system; and a user interface component configured to render the simulation on a client device, wherein the simulation component is configured to exchange data with an instance of a vendor-specific simulation platform within which a robot program to be executed by the industrial robot was developed, and to simulate operation of the industrial robot under control of the robot program based on execution of the robot program facilitated by exchange of the data with the vendor-specific simulation platform.

Also, one or more embodiments provide a method for simulating an industrial automation system, comprising executing, by a simulation system comprising a processor, a simulation of an industrial automation system based on a three-dimensional virtual model of the industrial automation system, wherein the three-dimensional virtual model includes a virtual robot model of an industrial robot, and wherein the executing comprises: establishing a communicative link between the simulation system and an instance of a vendor-specific simulation platform within which a robot program to be executed by the industrial robot was written, and simulating operation of the industrial robot under control of the robot program based on execution of the robot program facilitated by exchange of data between the simulation system and the vendor-specific simulation platform; and rendering, by the simulation system, the simulation on a client device.

Also, according to one or more embodiments, a non-transitory computer-readable medium is provided having stored thereon instructions that, in response to execution, cause a system comprising a processor to perform operations, the operations comprising simulating operation of an industrial automation system modeled by a three-dimensional virtual model, wherein the three-dimensional virtual model includes a digital robot model of an industrial robot, and wherein the simulating comprises: communicatively connecting the system to an instance of a vendor-specific simulation platform within which a robot program capable of execution on the industrial robot was generated, exchanging data between the system and the vendor-specific simulation platform to facilitate execution of the robot program, and simulating operation of the industrial robot under control of the robot program based on the execution of the robot program.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
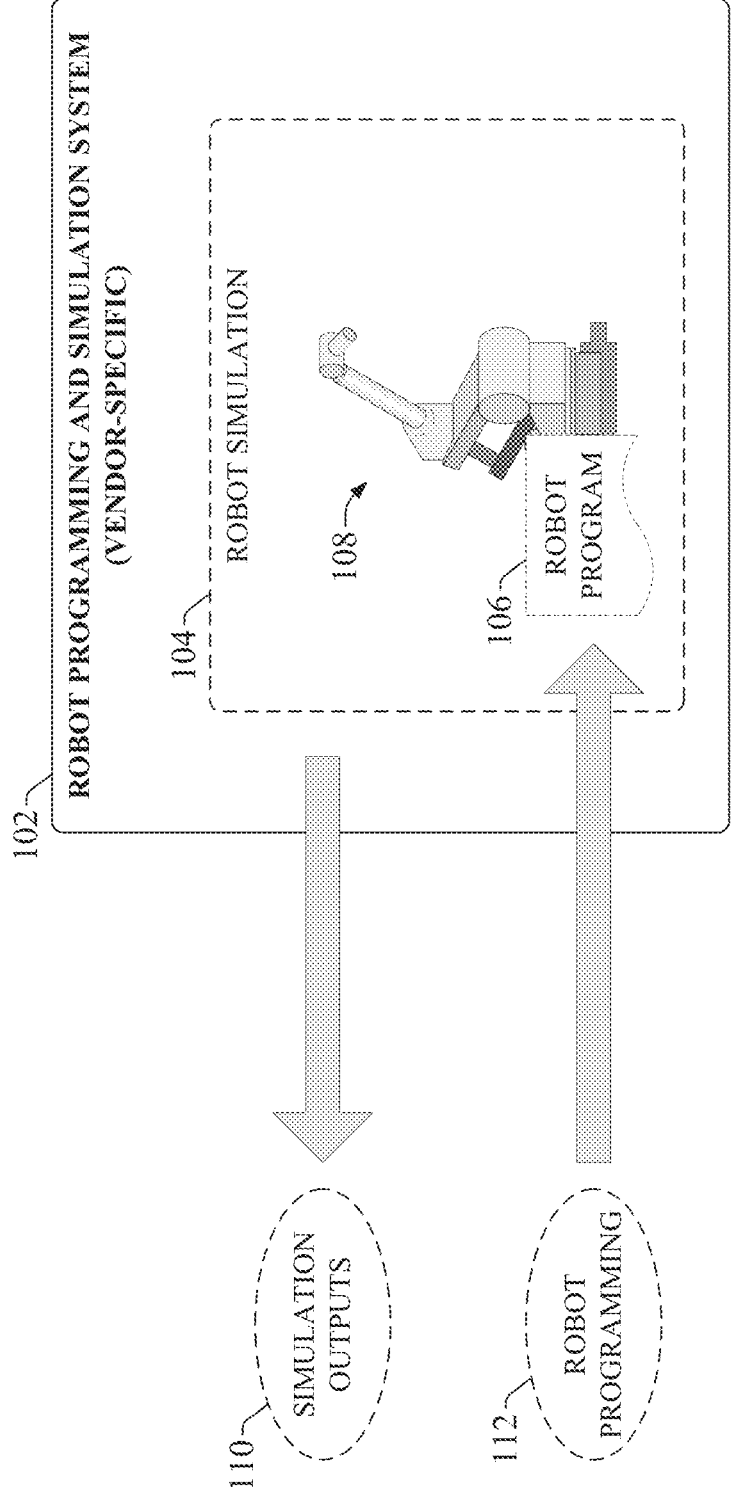
FIG. 1 is a diagram illustrating operation of a vendor-specific robot programming and simulation system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial automation systems often include multi-axis industrial robots that perform such functions as material handling (e.g., moving or stacking items of product), palettizing of products, machining of stock material (e.g., using machining tools articulated by a robot arm), product scanning, or other such functions. These industrial robots are typically available for purchase from robot vendors who may also provide software tools for configuring and programming their robots. In some cases, the programming language or algorithms used to program a given vendor's robots may be proprietary to that vendor.

To allow end users to safety test and debug their robot programs prior to deployment on the plant floor, some robot vendors many also provide vendor-specific simulation platforms that simulate the behavior of the robot under the control of a user-defined robot program. In some cases, these simulation platforms may be bundled with the robot programming and configuration software. FIG. 1 is a diagram illustrating operation of a vendor-specific robot programming and simulation system 102. A vendor's programming and simulation system 102 can include software tools that allow an end user to write a robot program 106 offline (that is, on a computing device that is disconnected from the physical robot) by entering robot programming input 112, often in a proprietary programming language that is specific to the robot vendor. To test the program, the system 102 can execute a robot simulation 104 in which operation of the robot under control of the robot control program 106 is digitally mimicked using a three-dimensional (3D) virtual model of the robot 108. The system 102 can render simulation outputs 110 indicating the expected operation of the robot based on operation of the simulation 104. This can include rendering the movements of the graphical representation of the robot 108 in virtual three-dimensional space in accordance with the control instructions represented by the robot control program 106, which allows the designer to verify that the simulated operation of the robot accords with the intended operation. Based on observation of the simulation outputs 110, the designer may modify the robot control program 106 to bring the simulated operation into closer alignment with desired operation and perform subsequent simulations until the expected robot operation is deemed acceptable. The tested robot control program 106 can then be downloaded to the physical robot.

This offline programming, simulation, and debugging process can allow the robot control program 106 to be thoroughly tested in a virtual environment prior to execution in the field, eliminating the risks involved with testing and debugging the program 106 on the physical equipment. However, a programming and simulation tool offered by a given robot vendor (e.g., programming and simulation system 102) is typically only designed to support programming and simulation of that vendor's robot. Consequently, simulation tools offered by robot vendors to support their machines are not capable of accurately simulating the entire industrial context within which the robot will be operating. In some cases, low-fidelity simulations of the immediate periphery surrounding the robot can be created in these vendor-provided simulation systems, but these peripheral simulations do not accurately model the physics of the surrounding area. These simulations may crudely simulate the movement of parts within the robot workcell—e.g., by assuming perfect gripping of parts by the robot in all cases when the robot's gripper moves within a defined proximity from the box—but such rough simulations do not accurately model the physics of part movement within and through the robot workcell, instead assuming error-free gripping and movement of the part by the robot in every instance.

Also, in conventional development workflows, if a program for an industrial robot is developed in a vendor-specific programming and a designer wishes to test this program in separate simulation platform that is not specific to the robot vendor, the robot program typically must be rewritten in the testing environment in a format supported by that environment. This not only necessitates duplication of work, but also yields a less accurate simulation since the robot program being tested is not that which will ultimately be executed on the physical robot, but rather is an approximation of the actual robot program.

To address these and other issues, one or more embodiments described herein support an industrial control design and testing system that supports a virtual real-world simulation of the industrial context within which a vendor's robot will be deployed. Rather than crudely simulating movement of parts within and through the robot area, the control design and testing system can apply physics modeling to accurately simulate the industrial context within which the robot will operate. This physics modeling can be based in part on aspect metadata added to components of the overall automation system model, including the robot. For example, the robot's end effectors can be enhanced with end effector metadata that accurately models the physics of the robot's grippers. By leveraging this physics modeling during the simulation, the testing system can predict instances in which the robot may have failed to pick up a part due to non-optimal robot movement or gripping relative to the movement, shape, and/or position of an incoming part.

Embodiments of the design and testing system can also allow vendor-specific digital twins of robots or other machines to be brought into the same simulation space so that coordinated operation of the multiple machines can be accurately assessed, even in cases in which robots or machines from a variety of different vendors are integrated into the same automation system. This can include bringing multiple virtual machines that were configured in separate vendor-specific platforms into the same virtual testing and simulation environment in order to assess how the aggregate system will operate. In the case of digital models that were developed in other vendor-specific design and simulation platforms, the design and testing system can link to instances of these vendor-specific platforms so that the virtual robots are simulated using the same algorithms used by the machine vendors' software. This allows the actual vendor-specific robot algorithms that will be executed on the physical robots to be executed on the simulation platform, eliminating the need to rewrite the programs in a format understandable by the simulation platform and yielding a more accurate robot simulation within the context of a vendor-agnostic simulation environment. According to this new development workflow, the robot program need only be written once within the vendor-specific development package and this vendor-specific program can be imported into the vendor-agnostic simulation platform supported by the control and simulation system, yielding a workable and accurate simulation model more quickly than before.

Figure 2:
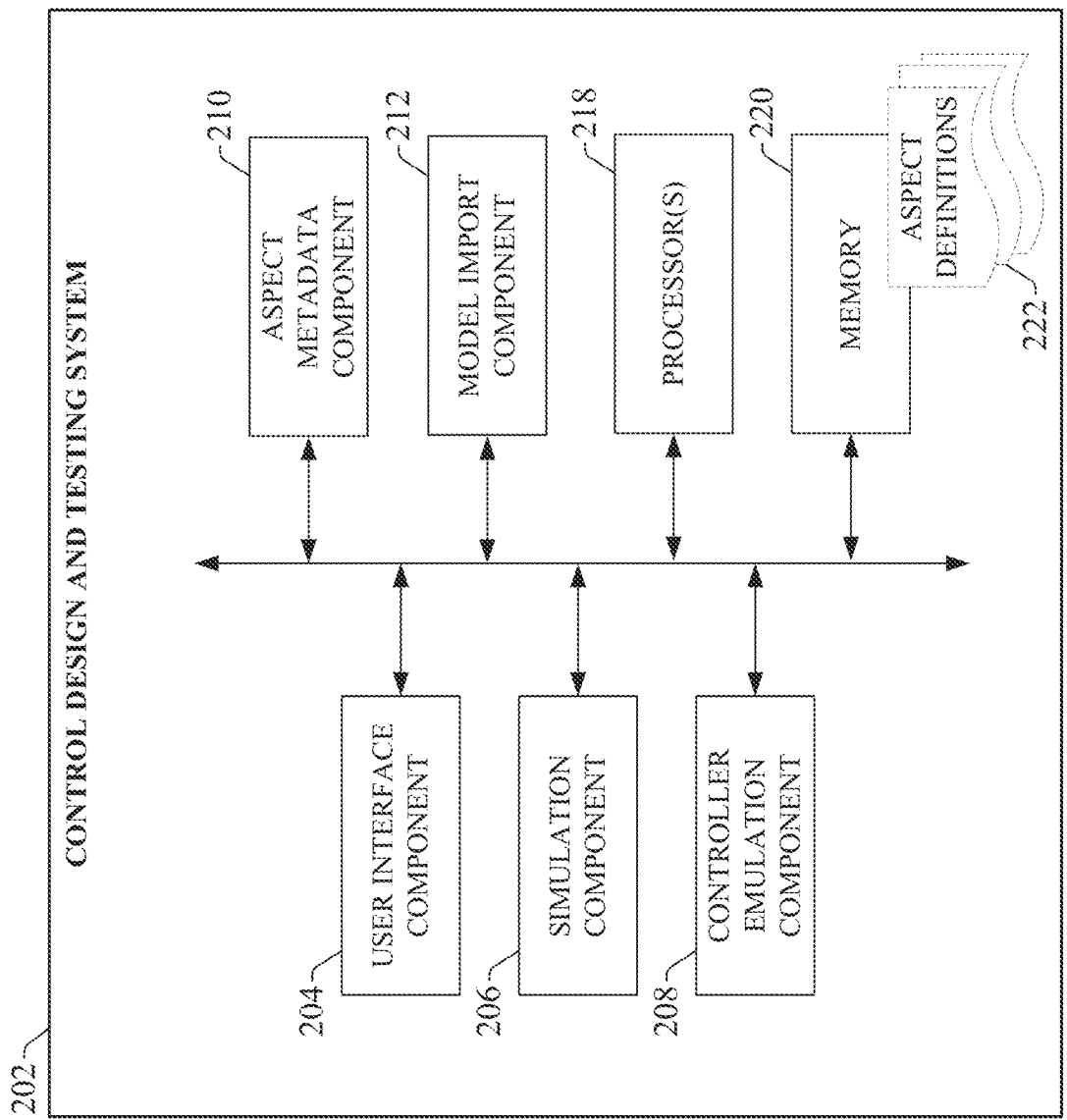
FIG. 2 is a block diagram of an example industrial control design and testing system that supports aggregation of robot digital twins imported from vendor-specific platforms, as well as labeling of a 3D model of an automation system with control aspects.

FIG. 2 is a block diagram of an example industrial control design and testing system 202 that supports aggregation of robot digital twins imported from vendor-specific platforms, as well as labeling of a 3D model of an automation system with control aspects. Control design and testing system 202 can include a user interface component 204, a simulation component 206, a controller emulation component 208, an aspect metadata component 210, a model import component 212, one or more processors 218, and memory 220. In various embodiments, one or more of the user interface component 204, simulation component 206, controller emulation component 208, aspect metadata component 210, model import component 212, the one or more processors 218, and memory 220 can be electrically and/or communicatively coupled to one another to perform one or more of the functions of the control design and testing system 202. In some embodiments, components 204, 206, 208, 210, and 212 can comprise software instructions stored on memory 220 and executed by processor(s) 218. Control design and testing system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to a user in any suitable format (e.g., visual, audio, tactile, etc.). In some embodiments, user interface component 204 can render interactive display screens on a display device (e.g., a display device associated with a desktop computer, a laptop computer, a tablet computer, a smart phone, etc.), where the display screens serve as the interface for a control design and/or simulation platform. The user interface can display virtual 3D simulations of automation systems being tested against an emulated industrial control program, render operational statistics representing expected performance of the automation system based on the simulation, and other such information. In some embodiments, the user interface component 204 can also render selectable design tools and receive design input via interaction with the tools in connection with configuring aspects for the industrial automation (e.g., I/O connectivity between devices of the virtual system and an industrial controller). Design tools made available by the user interface component 204 can include a set of automation aspects that can be selectively associated with mechanical elements or components of the automation system being designed. The aspects made available for selection are based on aspect definitions 222 maintained on the memory 220, which define the available aspects as well as associated simulation data for the respective aspects which can be used by a simulation platform to simulate operations or behaviors of the aspects within the context of an industrial simulation.

Simulation component 206 can be configured to simulate operation of a virtualized model of an industrial automation system under control of an industrial control program. Simulation component 206 can also be configured to communicatively link to instances of vendor-specific simulation platforms to facilitate simulation of the vendor's robot within the system 202 using the vendor's proprietary control algorithms.

Controller emulation component 208 can be configured to emulate execution of an industrial control program being testing on a virtualized (or emulated) industrial controller. Aspect metadata component 210 can be configured to assign aspect metadata to selected elements of a digital model of an automation system in accordance with design input received from the user. Model import component 212 can be configured to import a virtual twin of a robot or other machine, a mechanical CAD model of an automation system or machine, or another type of digital model of the system.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

In some embodiments, control design and testing system 202 may execute on a client device, such as a desktop computer, a laptop computer, a tablet computer, a mobile device, a wearable AR/VR appliance, etc. In other embodiments, system 202 may execute on a cloud platform or another high-level platform accessible to multiple users having authorization to access the system 202. In such embodiments, a client device can remotely access the system's design and simulation tools and leverage these tools to design and test a virtualized automation system.

Figure 3:
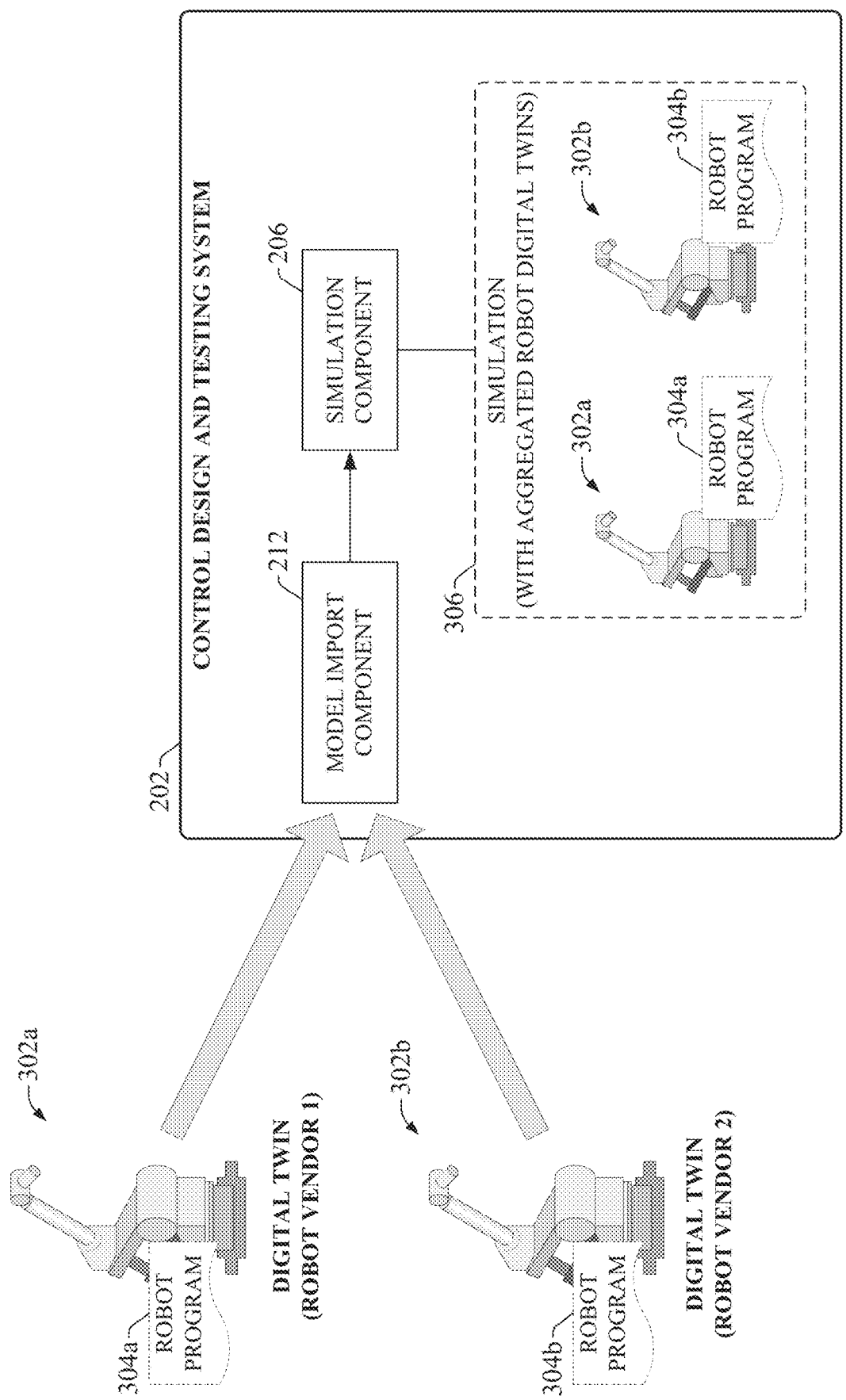
FIG. 3 is a diagram illustrating aggregation of vendor-specific robot digital twins into a common simulation environment supported by a control design and testing system.

FIG. 3 is a diagram illustrating aggregation of vendor-specific robot digital models 302 into a common simulation environment supported by control design and testing system 202 according to one or more embodiments. Control design and testing system 202 comprises a simulation component 206 that simulates operation of a virtualized model of an industrial automation system under control of an industrial control program. In general, the simulation platform executed by system 202 can test the control programming and mechanical design of the automation system by emulating execution of the control program against the virtual model of the automation system, a process referred to as virtual commissioning. The simulation carried out by the simulation component 206 mimics the behavior of the automation system's mechanical assets in response to execution of the control program on an emulated industrial controller (instantiated by the controller emulation component 208) so that proper operation can be verified prior to subsequent commissioning of the physical system and debugged control code. In some scenarios, the virtual model of the automation system being tested may be developed within the control design and testing system 202 itself. Alternatively, in some scenarios, at least some portions of the mechanical model of the automation system may have been developed in a separate computer-aided design (CAD) platform, imported into the system 202, and transformed to a simulation-ready digital model of the automation system capable of simulation by the simulation component 206, as will be described in more detail herein.

The industrial automation system being tested may comprise one or more industrial robots provided by one or more robot vendors. These industrial robots operate under the control of their own robot programs 304, either independently of or in conjunction with the primary industrial control program that will be executing on an industrial controller—e.g., a programmable logic controller (PLC) or another type of controller—to facilitate monitoring and control of the larger automation system.

In the example illustrated in FIG. 3, the automation system to be simulated includes two industrial robots (represented by robot models 302a and 302b, respectively) provided by respective two robot vendors (Vendor 1 and Vendor 2). Each robot is designed to be configured and programmed using its associated vendor's proprietary configuration platform and programming language. As noted above, some of these vendor-specific robot programming tools include simulation capabilities that allow a designer to virtually simulate a digital model 302 (e.g., a digital twin or another type of virtualized model) of the vendor's robot under the control of a user-designed robot program 304, allowing the designer to observe a simulation of the robot's expected operation under control of the user-defined program 304. However, since the vendor-specific simulation tools are designed primarily to support emulation of the vendor's own robot, the larger context within which the robot will operate—e.g., the larger automation system of which the robot will be a part—cannot typically be simulated accurately within the vendor's simulation platform.

Moreover, although a user's automation system may comprise robots provided by different vendors and programmed using those various vendors' programming tools and languages, there is no way to simulate these multiple robots together within a common vendor-specific simulation environment. Although it may be possible to create and test digital models for these various robots within another simulation platform, this would require the user to separately develop approximations of the robot control programs that can be executed on this separate simulation platform (e.g., using the simulation system's native programming tools), resulting in additional labor while yielding less accurate simulations of the robots relative to simulations performed within the vendors' own platforms.

To address these issues, one or more embodiments of control design and testing system 202 can incorporate digital models 302 (or other types of digital models) representing robots manufactured by one or more vendors into a larger digital model of an industrial automation system in which the robots will operate, and simulate these robot models 302 within the context of the automation system as a whole by executing, within the system's simulation environment, the actual robot programs 304 that will be executed on the physical robots. To this end, simulation component 206 can be configured to communicatively link to instances of the vendor-specific programming or simulation platforms to facilitate execution of the user-defined robot programs 304—in their vendor-specific proprietary format—within the system's simulation platform.

In the illustrated example, simulation component 206 is to execute a simulation 306 of an industrial automation system being designed and tested. Accordingly, a simulation-capable digital model of the automation system is created within, or imported into, the system 202 for execution as a simulation 306, which will mimic operation of the automation system under the control of one or more industrial control programs to be executed by associated industrial controllers. In addition to other machines and components—e.g., conveyors, motors, motor drives, workstations, tooling machines, guarding, sensors, piping, conduit, control panels, etc.—the digital model of the automation system is to include one or more robot models 302 representing industrial robots that are to be included as part of the automation system, as noted above. The industrial robots may be manufactured by a common vendor or may comprises robots provided by two or more different vendors. In either scenario, each robot will operate in accordance with a robot program 304 developed by the system designer and written using proprietary programming tools provided by the robot vendor.

In some embodiments, the robot models 302 to be simulated by the control design and testing system 202 can be imported from their respective vendor-specific robot simulation platforms by model import component 212 and integrated into the simulation 306 of the larger automation system. Alternatively, digital 3D models of the robots can be created within the control design and testing system 202 and added to the simulation 306, and simulation component 206 can simulate these robot models by linking to instances of the corresponding vendor-specific simulation platforms, as will be discussed below.

Figure 4:
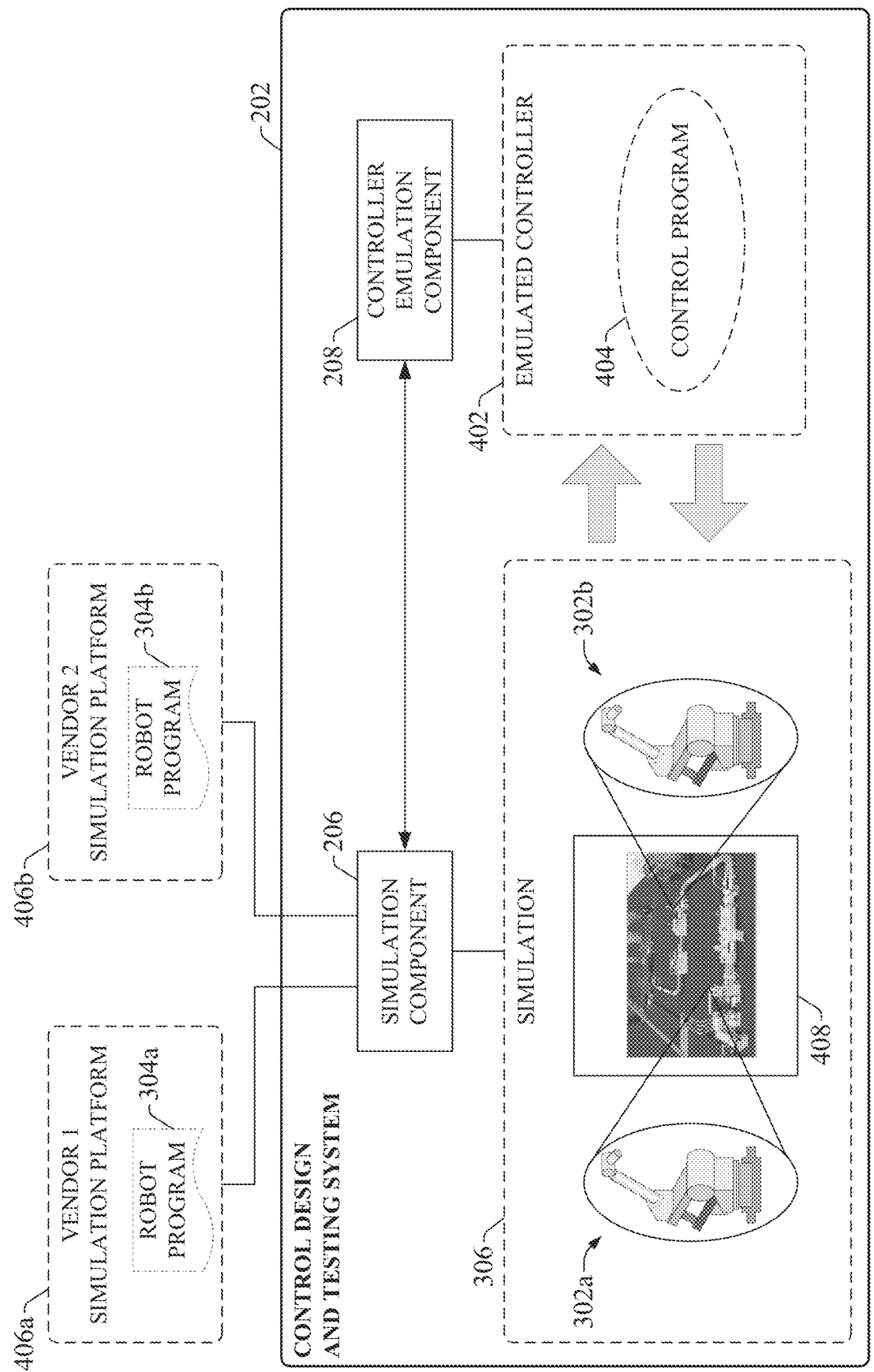
FIG. 4 is a diagram illustrating execution of an industrial simulation by a control design and testing system in which a simulation component communicates with instances of vendor-specific simulation platforms executing robot programs.

The simulation component 206 of control design and testing system 202 is configured to execute, within the simulation environment, the robot programs 304 that will be executing on the physical robots when deployed on the plant floor, even if the programs 304 are in a proprietary vendor-specific format, rather than requiring the developer to write an approximation of the actual robot program within the simulation environment for testing purposes. In some embodiments, this can be done by communicatively linking to instances of the vendor-specific simulation platforms. FIG. 4 is a diagram illustrating execution of an industrial simulation by control design and testing system 202, in which simulation component 206 communicates with instances of vendor-specific simulation platforms executing robot programs 304a and 304b. In this example, simulation component 206 executes a simulation 306 of the automation system being tested, and the automation system includes the two robots—manufactured by two different robot vendors—represented within the simulation as robot models 302a and 302b (e.g., digital twins or other types of virtual robot models). In this regard, the automation system being designed and tested may comprise a production line or other type of industrial assembly comprising a number of machines or other industrial assets (e.g., conveyors, motors, motor drives, operator stations, machining areas, palletizing stations, etc.) that are monitored and controlled by an industrial controller (e.g., a programmable logic controller or another type of controller) executing a control program 404. The two industrial robots operate within this industrial environment—under control of their respective robot programs 304a and 304b—to perform such functions as material handling (e.g., picking parts from one conveyor and moving to another, or picking parts from a conveyor and stacking on a pallet), machining of stock material, part scanning, or other such functions. The robot programs 304a and 304b may control their respective robots either autonomously or in coordination with the control program 404 to executed by the industrial controller.

The control design and testing system 202 comprises a controller emulation component 208 that emulates execution of the industrial control program 404 being testing on a virtualized (or emulated) industrial controller 402, and the simulation component 206 simulates operation of a virtualized model 408 of the industrial automation system under control of the industrial control program 404, where the virtual model 408 includes the digital models 302a and 302b of the two industrial robots integrated within the context of the larger virtual model 408 of the automation system as a whole. Within the control design and testing system 202, the virtual model 408 of the automation system can be interfaced with the control program 404 (e.g., ladder logic) being developed for the automation system to yield a virtual testing environment that allows both the mechanical and control designs to be virtually simulated and tested before finalizing the overall design and proceeding to the building and installation phase.

As noted above, the robot models 302a and 302b representing the two robots for virtual testing purposes may be created in, and imported from, the vendor-specific programming and simulation platforms provided by the robot vendors. In such scenarios, the robot programs 304a and 304b may have been developed using the vendor-specific robot programming tools provided by the respective vendors, and in some cases may have been pre-tested for each individual robot using vendor-specific simulation platforms also provided by the robot vendors. However, these simulations carried out on the vendor-provided simulation platforms typically cannot simulate operation of the robots within the full context of the larger automation system in which the robots will operate. Bringing the robot models 302a and 302b into the vendor-agnostic control design and testing system 202 and incorporating these models 302a and 302b into the virtual model 408 of the automation system in which the robots will operate can yield a more accurate test of the robots' operation within the aggregate automation system as a whole.

To simulate the actual operation of the robots within the simulation 306, simulation component 206 can be configured to communicatively link to instances of the vendor-specific simulation platforms 406a and 406b, which execute instances of the robot programs 304a and 304b using the real algorithms that the robot vendors use in their respective simulation platforms. The instances of the vendor-specific simulation platforms 406 may execute on the same computing device as control design and testing system 202 (sharing computing resources with system 202) or may execute on separate computing devices communicatively connected to the system 202.

During execution of simulation 306, in addition to mimicking the behavior of the other automation system components under control of control program 404, simulation component 206 simulates the behavior of each industrial robot (represented by robot models 302a and 302b) based on execution of robot programs 304a and 304b on their respective vendor-specific simulation platforms 406. In this regard, simulation component 206 can exchange simulation data with these separate simulation platforms 406a and 406b, including reading program outputs (e.g., values of program variables) generated by the robot programs 304a and 304b during execution, and writing inputs to the robot programs 304a and 304b based on states of the simulation 306 (e.g., simulated part present signals, emergency stop signals, operating mode indications, etc.). For example, if a robot program 304 is written such that a movement of its corresponding robot depends on states of multiple part presence sensors, simulation component 206 can provide the simulated states of these sensors to the vendor-specific simulation platform 406 executing the program 304. The expected behavior of the robots can be mimicked by the simulation component 206 based on program outputs generated by the robot programs 304*a* and 304*b* as well as mechanical properties of the robots encoded in the robot models 302*a* and 302*b* (e.g., physical dimensions, axes of motion, motion constraints, etc.). Simulation component 206 can perform any time synchronization necessary between execution of the simulation 306 and execution of the robot programs 304*a*, 304*b* to ensure that the expected real-time interactions between the robots and the other components of the automation system are accurately represented.

Using this architecture, the system 202 allows a virtual robot that was configured in its native vendor-specific testing and simulation platform 406 to be brought into an accurate virtual representation of the larger automation context (model 408) in which the robot will be operating, and simulate operation of the robot within this virtual context using the same robot program 304—executed using the robot vendor's native control algorithms—that will be executed by the physical robot. Since system 202 is agnostic with regard to robot vendor, multiple robots that were configured and programed on respective different vendor-specific platforms 406 can be brought into a common simulation environment to verify operation of the aggregate automation system comprising the multiple robots and the other industrial assets making up the automation system. When the designer is satisfied with the virtual operation of the automation system, the control program 404 and robot programs 304 can be installed on their respective industrial controllers and robots when the actual automation system is commissioned.

Figure 5:
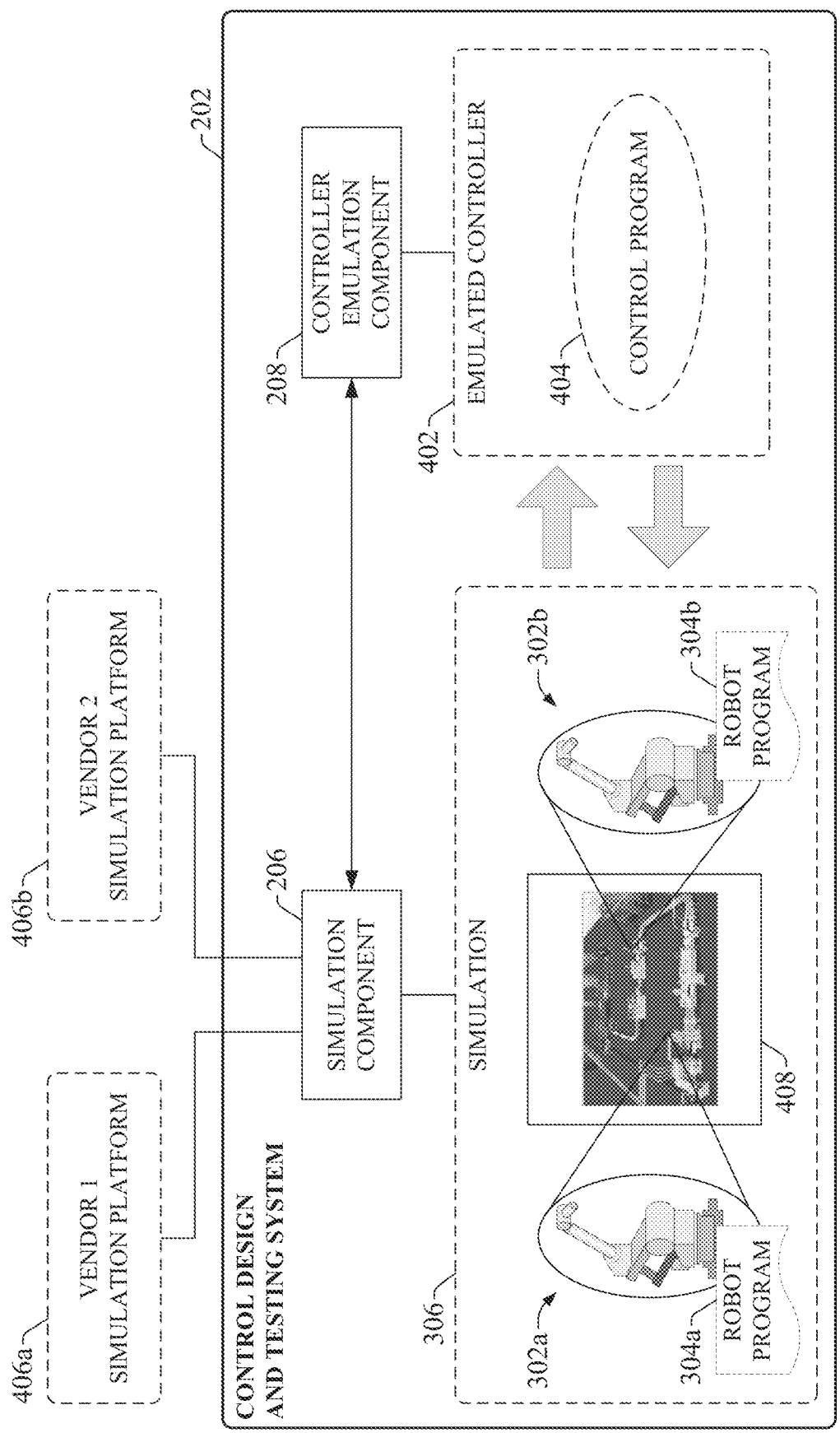
FIG. 5 is a diagram illustrating a configuration in which robot programs are imported into and executed on a vendor-agnostic industrial simulation system.

As an alternative to executing the robot programs 304 on the vendor-specific platforms 406, some embodiments of system 202 may also be configured to import and execute the robot programs 304 directly on system 202. FIG. 5 is a diagram illustrating this configuration. According to this architecture, the robot programs 304*a* and 304*b* have been imported into system 202 for execution in connection with simulating the robot models 302 within the context of the industrial automation simulation 306. Although the robot programs 304*a* and 304*b* were programmed using their respective robot vendors' proprietary programming language, simulation component 206 can execute these robot programs 304*a* and 304*b* by communicatively linking to the instances of the vendor-specific simulation platforms 406*a* and 406*b*. For example, simulation component 206 may access and utilize any proprietary resources available on the simulation platforms 406 (e.g., execution algorithms, libraries, operating systems, etc.) required to accurately translate and execute the robot programs 304 locally on system 202. This approach can allow simulation 306 to execute faster-than-real-time if desired since the same system clock (that of system 202) can be used for all executable portions of the simulation.

Also, in some embodiments, rather than importing robot models 302 that were developed in the vendor-specific programming and simulation platforms 406, simulation-capable 3D digital models of the robots may be developed in the control design and testing system 202, and these digital models can be linked to vendor-specific robot programs 304 and animated to simulate operation of the robots under control of the vendor-specific programs 304.

Figure 6:
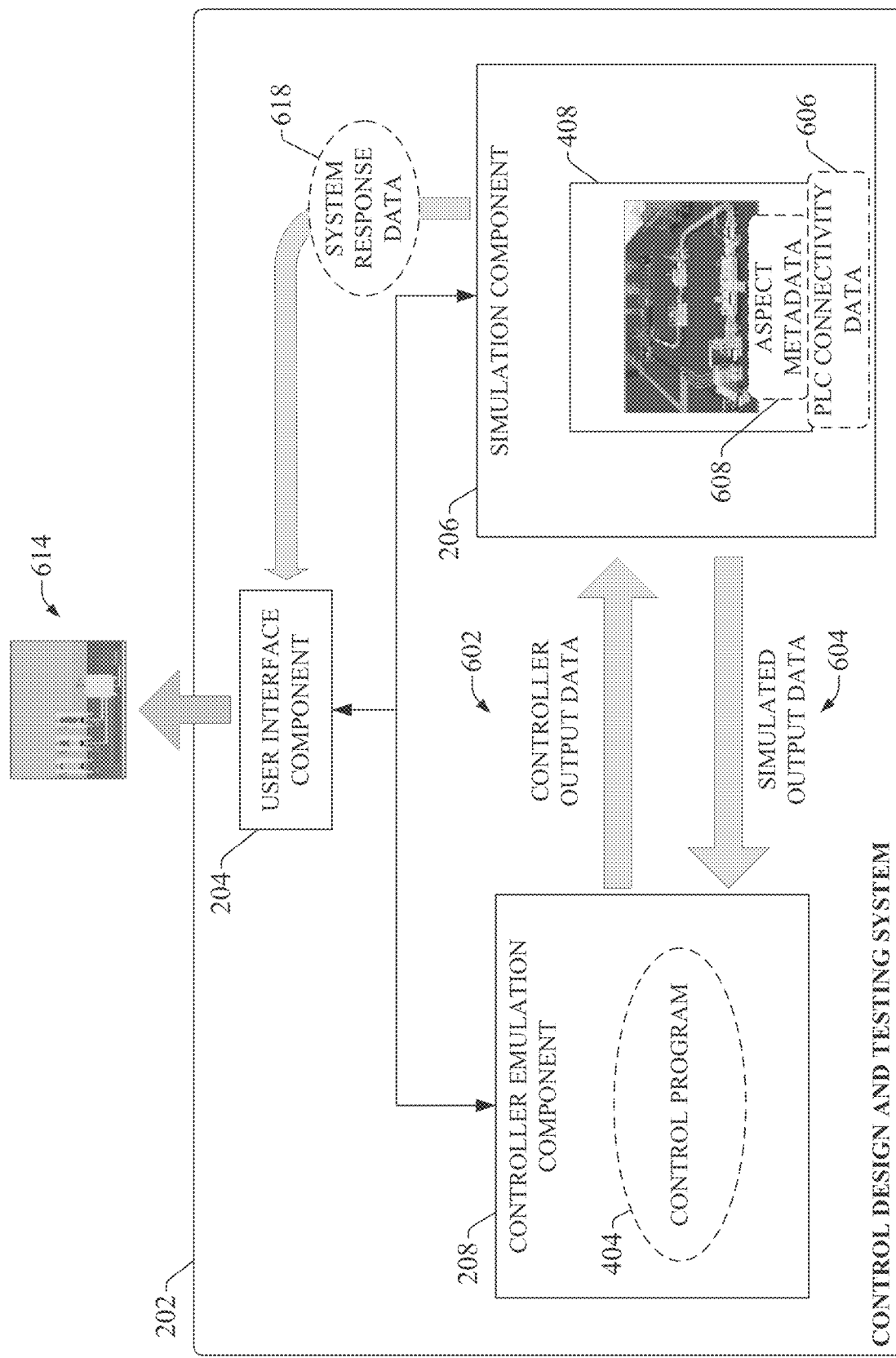
FIG. 6 is a diagram illustrating simulation of a virtualized model of an industrial automation system within a control design and testing system to virtually mimic the behavior of the physical automation system under control of a control program.

Providing the ability to accurately simulate robot models 302 using the robot vendors' own robot programs 304 within the vendor-agnostic industrial simulation platform supported by system 202 allows the operation of the robots to be simulated and tested within a high fidelity model 408 of the automation system and its associated products, thereby allowing a designer to observe and assess the robots' expected interactions within a more robust simulation of the robot's intended environment than could be created within the vendor-specific simulation platforms 406. FIG. 6 is a diagram illustrating simulation of the virtualized model 408 of the industrial automation system—which can include one or more robot models 302—within the control design and testing system 202 to virtually mimic the behavior of the physical automation system under control of a control program 404. In general, mechanical and/or control components of the automation system are represented by three-dimensional digital models of those components that include associated aspect metadata 608 defining simulation characteristics or behaviors of those components. Aspect metadata 608 for a given component or machine of the automation system is particular to the type of industrial component or machine (e.g., a joint of a particular type, a motor, a sensor, a conveyor, etc.), and causes the component or machine to be recognized by the simulation component 206 as control or activation elements. Aspect metadata 608 for the various elements of the digital model 408 of the automation system instructs the simulation component 206 as to how each element behaves within a simulation context in response to control and physical stimuli.

Since the digital model 408 models mechanical characteristics of the automation system as well as behavioral properties of components that make up the model 408 (by virtue of the aspect metadata 608), the digital model 408 can be used to simulate expected operation and behavior of the automation system while under control of the control program 404. The simulation allows a designer to view and verify the simulated system's responses to control inputs in terms of movement, speeds, flows, temperatures, fill levels, movement of product through the system, etc. In the example depicted in FIG. 6, controller emulation component 208 of the system 202 acts as an industrial controller emulator to execute control program 404, which may be a control program 404 being developed and tested against the digital model 408 of the automation system (control program 404, which will execute on an industrial controller when the physical automation system is commissioned, is typically separate from the robot programs 304 which execution on the robots).

Simulation component 206 can leverage the mechanical characteristics and associated aspect metadata 608 encoded in the digital model 408 to simulate operational aspects of the automation system to be monitored and regulated by the control program 404. To achieve this, a user (e.g., a controls engineer) can virtually interface control program 404 with the digital model 408 to facilitate exchange of simulated I/O data between the program 404 and the digital model 408, thereby simulating real-world control and operation of the automation system. To this end, the developer can use the system's configuration tools (e.g., a tag browser) to selectively map controller I/O defined by the control program 404 to I/O defined for the active control elements of the digital model 408. In an example scenario, the controls engineer may define the controller tags (e.g., PLC tags) and I/O addresses that drive a motor, actuator, or other component defined in the digital model 408, and selectively link the tags and associated I/O addresses to the I/O points defined for the modeled component. This I/O mapping between the control program 404 and the digital model 408, which is part of the overall automation system design, can be stored in an appropriately formatted file (e.g., a spreadsheet or another type of file) as PLC connectivity data 606 and integrated with the digital model 408. Thus, the digital model 408 maintains this aspect of the control design in addition to the mechanical design aspects.

Control program 404 can comprise any conceivable type of code used to process input signals read into a controller and to control output signals from the controller—including but not limited to ladder logic, sequential function charts, function block diagrams, or structured text—and is designed to regulate the automation system being modeled by digital model 408. During simulation, simulation component 206 generates digital and analog I/O values representing, for example, sensor outputs, metering outputs, or other plant data analogous to the data expected to be generated by the physical system based on the static and dynamic characteristics of the physical system represented by the digital model 408. This simulated output data 604 is provided to the emulation component 208 executing control program 404, which receives this data 604 as one or more virtual physical inputs. Control program 404 processes these inputs according to user-defined algorithms and generates digital and/or analog controller output data 602 based on the processing. This output data 602 represents the physical outputs that would be generated by a controller executing control program 404 and transmitted to the hardwired field devices comprising the automation system (e.g., PID loop control outputs, solenoid energizing outputs, motor control outputs, actuator control outputs, robot control outputs, etc.). The controller output data 602 is provided to the appropriate input points of the digital model 408 in accordance with the user-defined I/O mapping.

Concurrently and in conjunction with this controller-based emulation, any robot models 302 included in the digital model 408 are simulated to mimic behavior of their corresponding physical robots within this simulated industrial context under the control of their respective robot programs 304, as described above in connection with FIGS. 4 and 5. This entails interactions with other virtualized components of the automation system, as well as with virtual products or materials moving through the automation system.

In addition to generating simulated output data 604, simulation component 206 also generates system response data 618 based on analysis of the simulated data exchange and expected behaviors of the modeled automation system in response to the simulated controller output data 602. The simulation component 206 estimates and simulates the virtual automation system's responses to the emulated controller outputs (and the timings of these outputs) based on the behavioral and physical properties and constraints defined by the aspect metadata 608 associated with respective control elements of the digital model 408. For example, based on the mechanical and behavioral characteristics of the industrial components modeled in the by the digital model 408 (e.g., conveyors, industrial robots, machines, simulated products, etc.), as represented by the aspect metadata 608, simulation component 206 can predict expected behaviors of the modeled industrial components—as well as behaviors of products being manufactured, processed, or handled by the components—in response to the controller output data 602, and convey this predicted behavior as system response data 618. Example behaviors represented by system response data 618 can include, but are not limited to, movements and trajectories of the industrial robots (based on execution of the robot programs 304), movement of product through the simulated automation system (including speeds, accelerations, locations, lags, collisions, gripper failures, etc.), flow rates of fluids through the system, expected energy consumption by the system, an expected rate of degradation of mechanical components of the system (based in part on coefficient of friction information defined in the digital model 408), expected forces applied to respective components of the system during operation, or other such behaviors.

User interface component 204 can generate a visualization 614 that renders results of the simulation on a client device. Visualization 614 can render a graphical representation of the automation system based on the digital model 408, and animate this graphical representation based on the system response data 618 and/or other calculated statistics relating to the simulation session, yielding a three-dimensional visual presentation of the automation system in operation. Some of the simulation data can also be rendered as alphanumeric overlays on visualization 614. This simulation technique can be used to test and debug control programs without putting field equipment and machinery at risk, to test modifications to machine operations and estimate how such modifications affect certain key performance indicators or financial metrics, or to perform other types of analytics.

In some embodiments, users can control a speed of the simulation at a high degree of granularity. For example, a user may select to execute the simulation in real-time, such the simulation depicts operation of the automation system as it would transpire in real-time. Alternatively, the user may selectively choose to execute some or all phases of a simulated control sequence or process faster than real-time, in accordance with a time base specified by the user. This causes the simulation and its associated analysis to transpire within a compressed time frame.

Figure 7A:
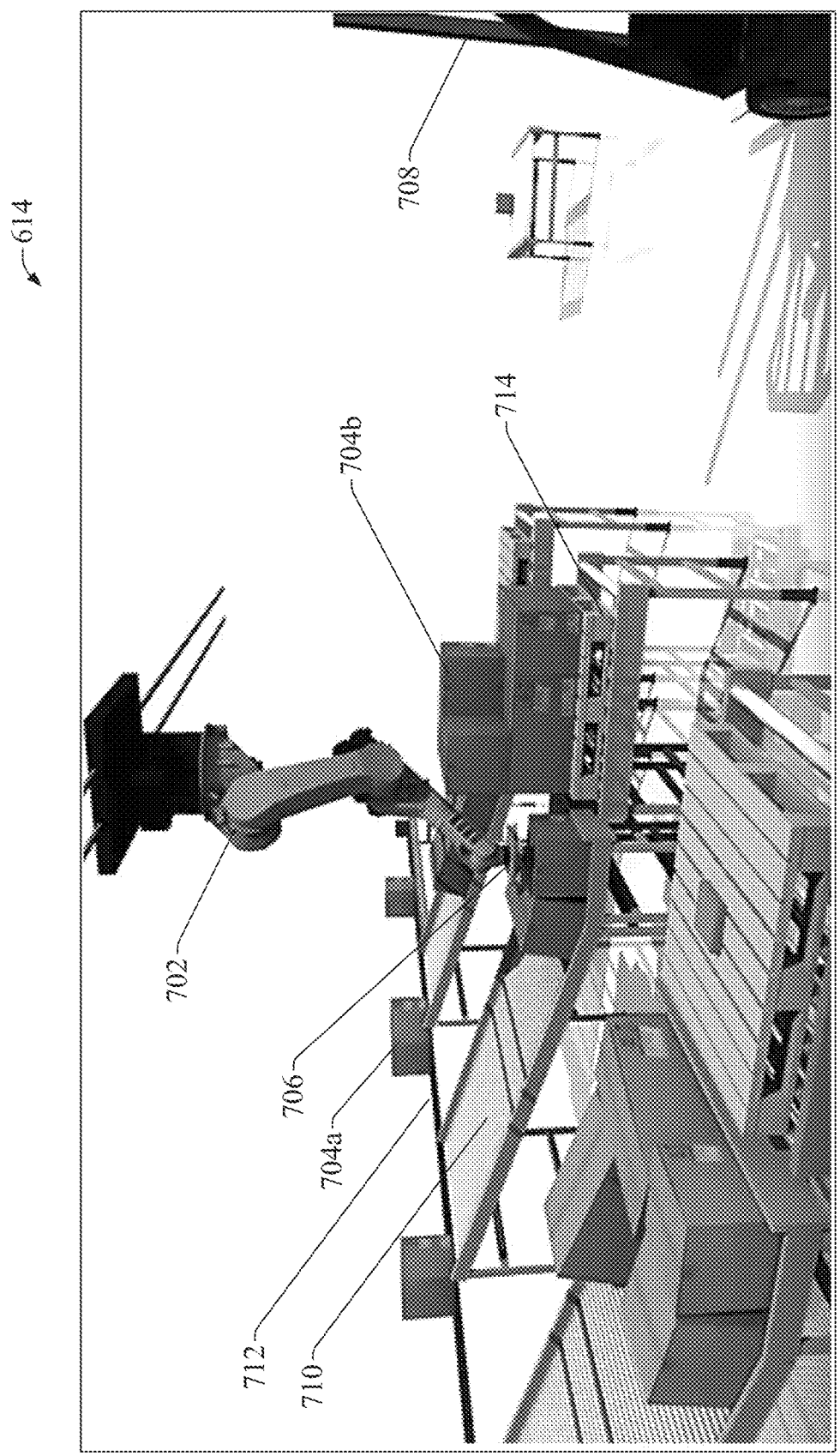
FIGS. 7a and 7b are still images of an example visualization that can be rendered by a user interface component of an industrial control and testing system.
Figure 7B:
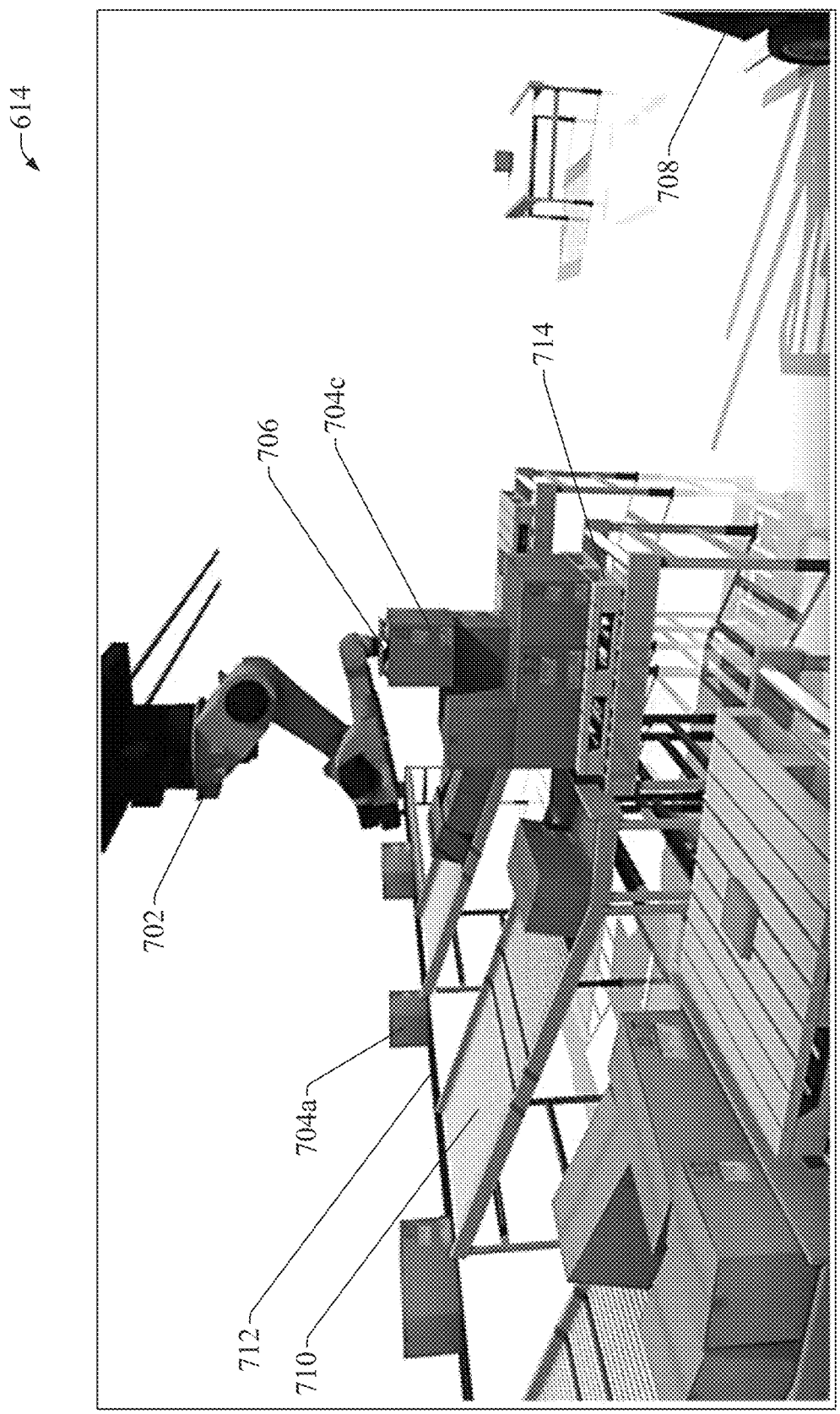

FIGS. 7a and 7b are still images of an example visualization 614 that can be rendered by user interface component 204. This example visualization 614 represents a simulation of an automation system comprising a conveyor 712 that transports boxes 704 to be stacked onto pallets 714 located at the end of respective chutes 710. Each box 704 is deposited on one of the available chutes 710, and a stacking robot 702 picks each box 704 in turn from the bottom of the chute 710 (as illustrated in FIG. 7a) and stacks the box 704 on the pallet 714 located at the end of the chute 710 (as illustrated in FIG. 7b). The simulation also includes a simulated model of a forklift 708, which collects and removes each pallet 714 once the pallet 714 has been stacked with its full allotment of boxes 704.

The look and behavior of the animated three-dimensional visualization of the aggregate automation system is based on the digital model 408 and its associated aspect metadata 608, which defines the simulation behaviors of the respective components of the automation system (e.g., the conveyor 712, the motors that drive the conveyor 712, the forklift 708, the machine that deposits boxes 704 on the conveyor 712, etc.). The behavior of the simulation is also based on emulated execution of control program 404, which virtually monitors and controls automation components of the system via the system's virtual I/O (e.g., sensor inputs, outputs to motor drives and pneumatic actuators, etc.). The behavior of the stacking robot 702 within this context is controlled based on execution of the robot program 304 as described above in connection with FIG. 4 or 5. In this regard, the robot program 304 may have been developed in the vendor-specific programming and simulation platform 406 provided by the vendor of the robot 702, and simulation component 206 simulates the behavior of the robot 702 based on execution of the same version of the robot program 304 that will be installed and executed on the corresponding physical robot when the actual automation system is commissioned.

As described above, simulation component 206 can execute the robot program 304 by linking to an instance of the vendor's own simulation platform 406. The graphical representation of the robot 702 and its defined motion abilities and constraints are defined by the robot model 302.

Figure 8:
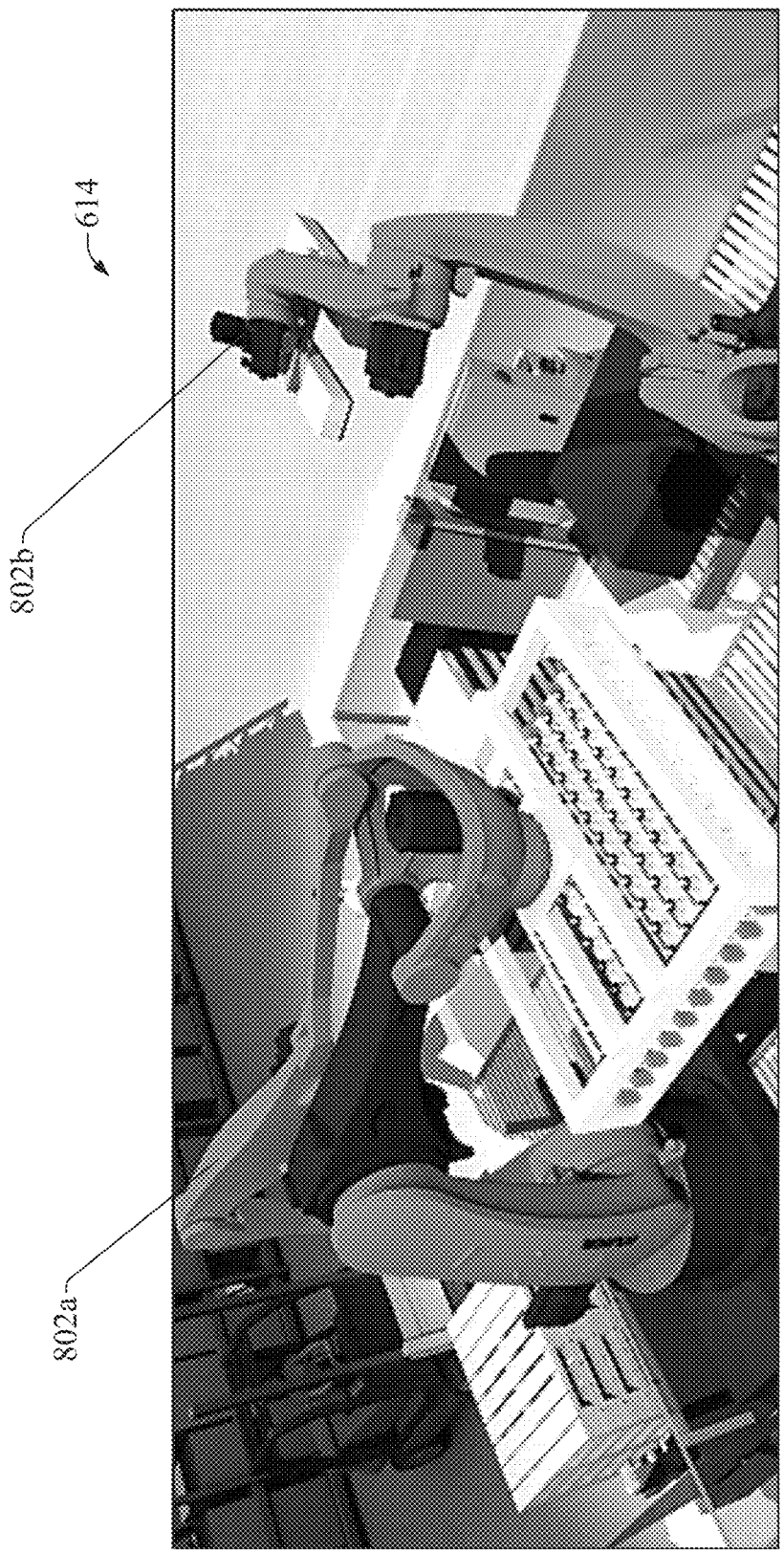
FIG. 8 is another still image of an example visualization that can be rendered by the user interface component.

FIG. 8 is another still image of an example visualization 614 that can be rendered by user interface component 204. In this example, the automation system comprises two industrial robots 802a and 802b. The two robots 802a and 802b may have been manufactured by two different robot vendors, and are programmed using two different programming formats that are proprietary to their respective vendors. Simulation component 206 can simulate the behavior of the two robots 802a, 802b within the context of the larger automation system by linking to instances of the respective vendor-specific simulation platforms 406 to execute the respective robot programs 304.

Figure 9:
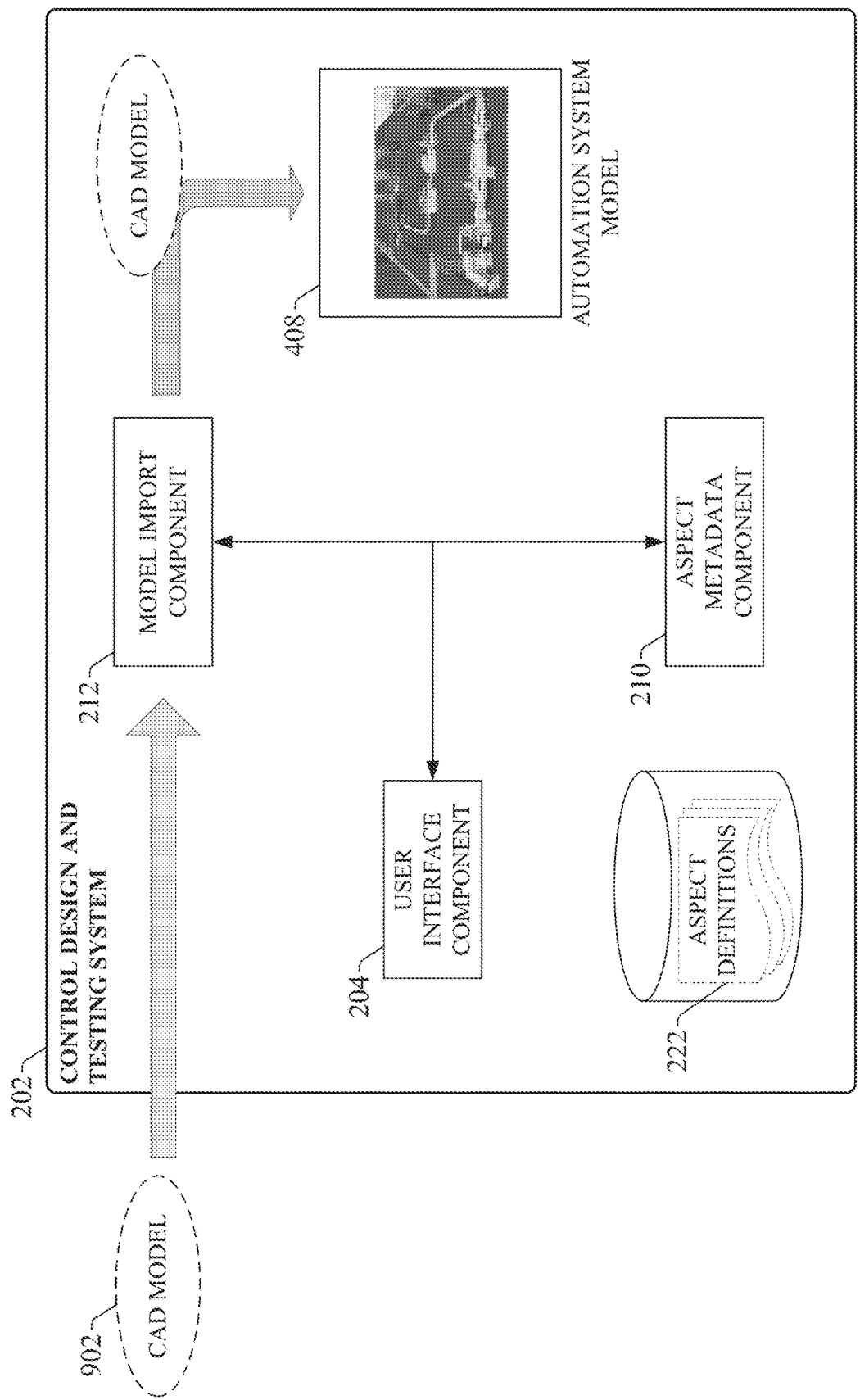
FIG. 9 is a diagram illustrating importing of a mechanical CAD model into a control design and testing system.

As noted above, the digital model 408 of the automation system can comprise an assembly of simulation-capable digital representations of mechanical and/or control elements that make up the automation system. In some scenarios, a designer can create this virtual assembly within the control design and testing system 202 as part of the design process; e.g., by selecting components to be included in the automation system from a library of available components (representing such elements as conveyors, motors, motor drives, workstations, tooling machines, guarding, sensors, piping, conduit, control panels, safety devices, etc.) and adding these components to the aggregate digital model 408. Some embodiments of control design and testing system 202 can also allow some or all of the virtual components of the automation system to be imported as mechanical CAD models, which can then be transformed into simulation-capable digital models of those components by adding aspect metadata to those CAD models. FIG. 9 is a diagram illustrating importing of a mechanical CAD model 902 into control design and testing system 202.

In this example, a user can import a CAD model 902 representing one or more mechanical structures or devices to be included in the automation system. The CAD model 902 may represent a mechanical design for one or more components of the automation system developed within a separate CAD system, and model import component 212 can import this model 902 either directly from the CAD system or from another source. CAD model 902 may comprise a three-dimensional graphical representation of such industrial assets as industrial robots, conveyors, tooling machines, motors, motor drives, sensors, piping, conduit, platforms, safety gates and fences, control cabinets, or other such assets. If CAD model 902 represents an assembly of components of the automation system, the model 902 may also specify the locations and orientations of these graphical representations relative to one another, physical connections between the mechanical elements, or other such mechanical properties and relationships. Once imported, the designer can incorporate the CAD model 902 into the greater automation system model 408.

Figure 10:
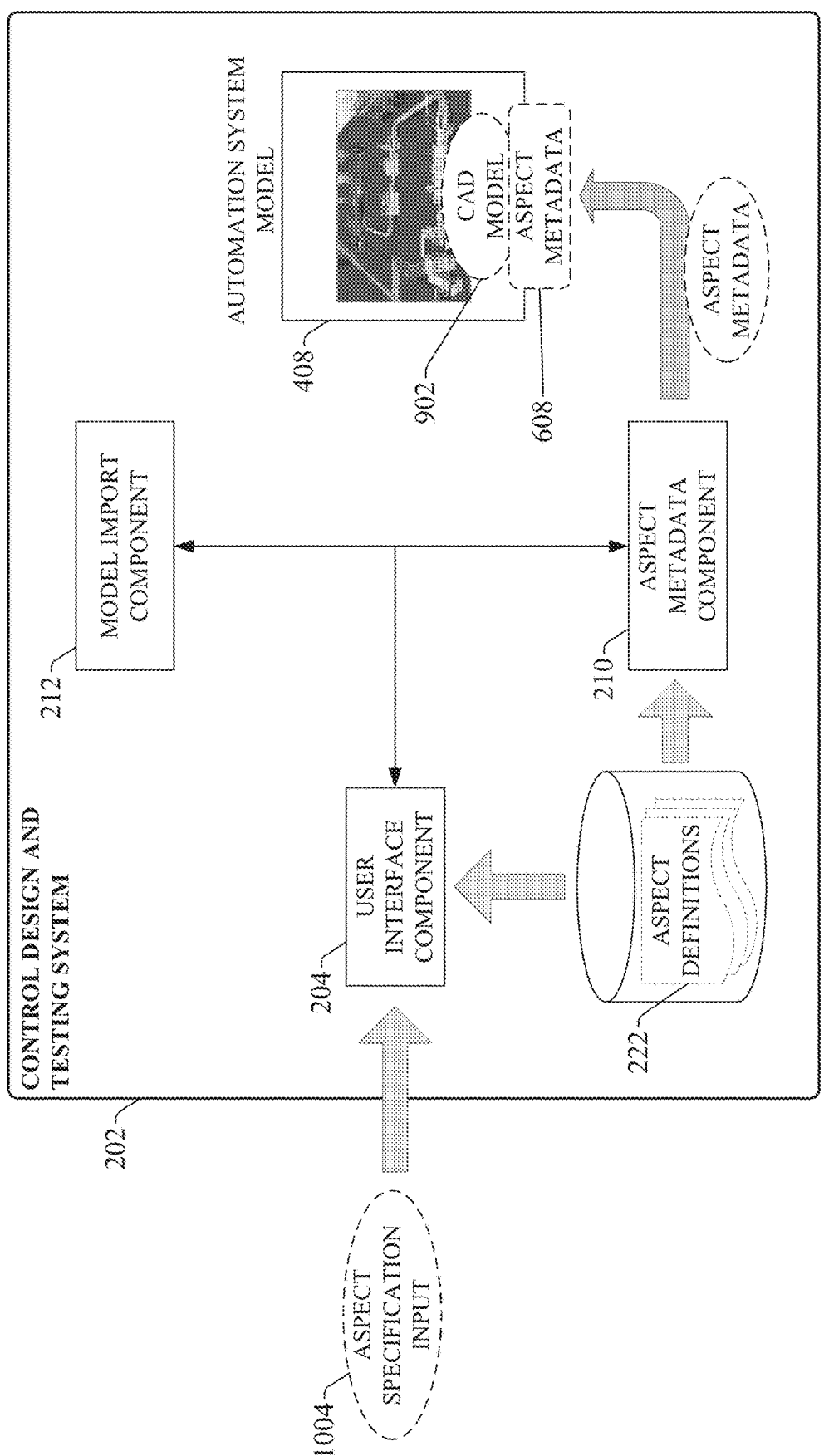
FIG. 10 is a diagram illustrating the addition of aspect metadata to a CAD model.

Typically, the mechanical CAD model 902 is essentially only a three-dimensional technical drawing suitable for use as a guide for building and installing the automation system but without simulation capabilities. In some embodiments, control design and testing system 202 can include an aspect metadata component 210 that allows the user to enhance the CAD model 902 with aspect metadata that transforms the CAD model 902 to a simulation-capable digital model of the automation system (or components thereof) that can be executed within a simulation platform to mimic operation of the system. FIG. 10 is a diagram illustrating the addition of aspect metadata 808 to the CAD model 902. In one or more embodiments, the graphical interface displays rendered by user interface component 204 can include one or more toolbars for adding aspect metadata to selected elements or components of the CAD model 902, or any other element of the digital model 408 of the automation system. The aspects made available for selection are based on the aspect definitions 222 stored on the system 202 (e.g., on memory 220).

Each aspect definition 222 defines a set of physical, kinematic, or mechatronic properties that dictate how that aspect behaves within a simulation environment. The properties defined by an aspect definition 222 substantially mirror physical behaviors and characteristics of the corresponding physical aspect in the real world. Control design and testing system 202 classifies the aspect definitions 222 according to the type of mechanical element, control element, or device for which the physical properties are defined. The aspect toolbar rendered by the user interface component 204 lists the available aspects according to these classifications for selection by the user. Example aspects that can be selected and applied to the digital model 408 (e.g., to the imported CAD model 902, to the robot digital twin(s) 302, or to other components of the digital model 408) include, but are not limited to, various types of dynamic or kinematic joints (e.g., slider joints, revolute joints, robot arm joints, hinges, etc.), movement surfaces such as conveyors, motors, grippers (e.g., suction grippers, mechanical grippers, etc.), sensors, pneumatic or hydraulic actuators (e.g., pusher arms, stoppers, etc.), rollers, or other such elements of the mechanical system.

The catalog of aspect definitions 222 can also include various types of robotic end effectors (e.g., mechanical grippers, suction grippers, etc.). End effector aspect definitions 222 can define physical properties (e.g., 3D physics constraints) for their corresponding gripper types, which can be used by the simulation component 206 to more accurately mimic operation of a robot's part handling behavior at a low level of abstraction. In general, the simulated interactions between virtual industrial robots and the products handled by these robots (e.g., boxes 704) can depend in part on the type of gripper aspect metadata 508 associated with the robot's end effector (e.g., end effector 706). For example, a suction gripper aspect applied to a representation of a robot defined in the mechanical model 402 may indicate to the simulation component 206 that the robot's end effector (e.g., end effector 706 in FIGS. 7a and 7b) is to be modeled as a suction gripper, whereby products in proximity of the suction gripper can be assumed to have been gripped by the robot (via suction), and can subsequently be moved in tandem with the robot arm to simulate movement of the part by the robot. By contrast, a mechanical gripper aspect may imply more complicated physics involved with movement of a part by the gripper. In the case of a mechanical gripper aspect, constraints of a physics engine may be used to determine whether the sides of the gripper are touching respective sides of a product at a proper location and angle before allowing the part to move in tandem with movement of the robot (due to friction between the gripper arms and the product surfaces). Since secure gripping of the product by a mechanical gripper depends on proper alignment of the product upon entering the picking station from which the robot grips the part, as well as the relative alignment between the product and the robot's gripper at the time of pick-up, the simulation component 206 can assess these factors during the simulation to determine whether the product has been properly gripped, or alternatively whether a mis-grip is likely to occur due to misalignment. Instructions regarding how to properly assess this gripping behavior can be provided by the mechanical gripper aspect metadata 608 assigned to the robot.

Some aspect metadata 608 can also designate components of the digital model 408 as load sources, which introduce discrete items of product (e.g., boxes, luggage, manufactured parts, fluid material, or other such product) into the system. When a load source aspect label is applied to an element of the model 408, user interface component 204 can prompt the user to provide user-defined operating parameters for the designated load source, such as a rate at which products are introduced to the system, a shape of the products (e.g., boxes or cylinders having specified dimensions, items made of a flexible material and having random variable shapes, etc.), collision physics associated with the products, or other such characteristics. When the digital model 408 is subsequently simulated, the simulation component 206 simulates release of product items (e.g., boxes 704 in the example depicted in FIGS. 7a and 7b) by the labeled load source in accordance with the load source aspect metadata 608.

The process of adding aspect metadata 608 to the digital model 408 involves labeling selected mechanical components or devices represented by the model 408 as being one of the available control aspects (represented by one of the aspect definitions 222). This aspect labeling workflow can be performed by submitting aspect specification input 1004 via interaction with the graphical interface displays rendered by user interface component 204. For example, a user may select, as an aspect, a type of robot joint from the aspect toolbar and subsequently select an element of the mechanical model 408 to be labeled as this type of joint. In response to these selections, aspect metadata component 210 associates the aspect metadata 608 for the selected type of robot joint with the indicated component of the digital model 408, thereby transforming the static graphical representation of the joint to an active virtual control element whose behavior can be virtually simulated within the simulation platform. The aspect metadata 608 assigned to the selected mechanical component is drawn from the aspect definition 222 corresponding to the indicated type of aspect.

Figure 11:
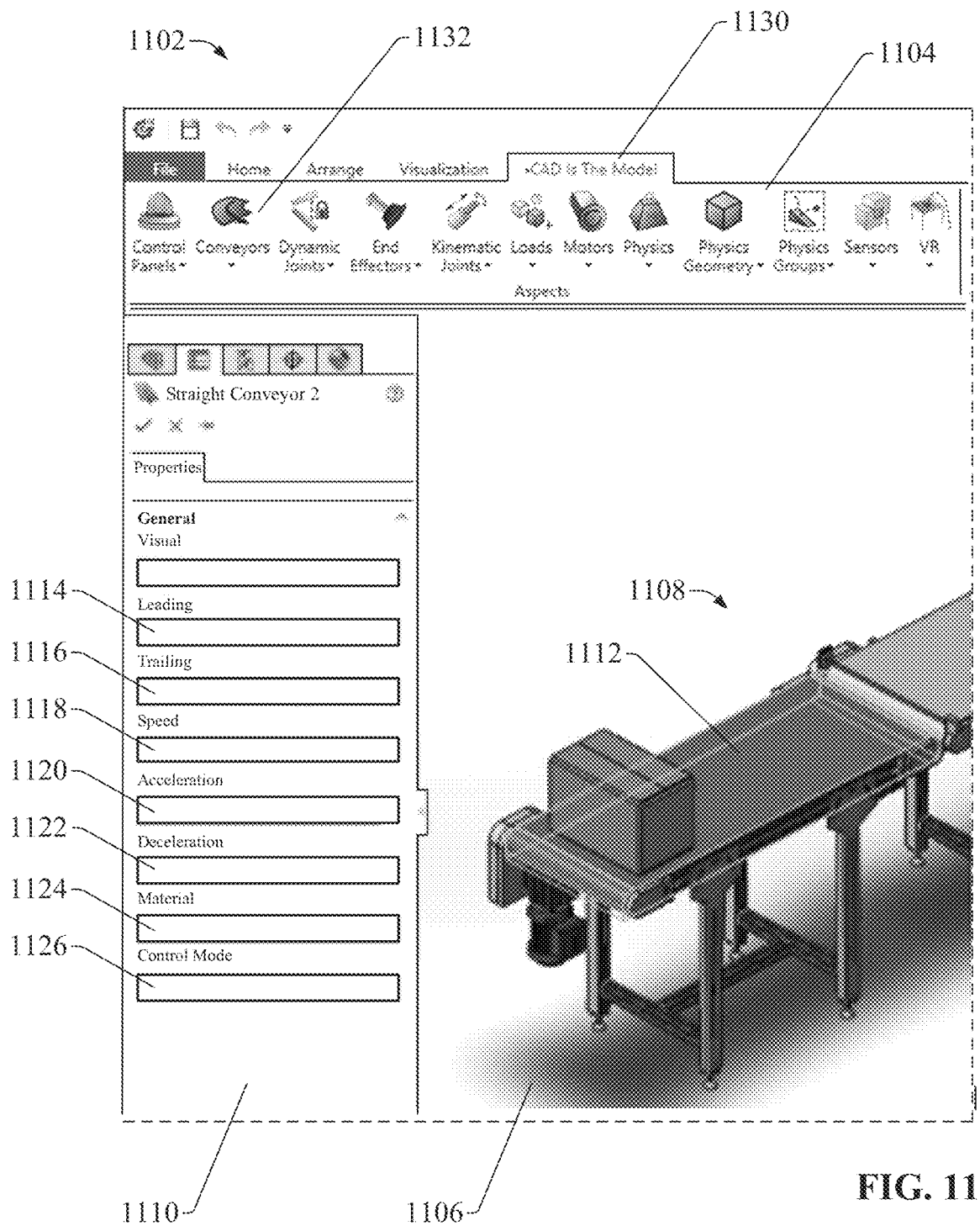
FIG. 11 is an example interface display that can be rendered by a user interface component of a control design and testing system and used to assign aspect metadata to selected elements of a digital model.

Aspect metadata 608 can define substantially any type of information that can be recognized and leveraged by simulation component 206 to accurately model the runtime movement and behavior of the corresponding mechanical component in response to control inputs or simulated forces. Depending on the aspect, the aspect metadata 608 may comprise default fixed values or properties that are globally applicable to all instances of that aspect, as well as user-defined metadata that can be customized by the user to conform to the specifics of the user's system. FIG. 11 is an example interface display 1102 that can be rendered by the user interface component 204 and used to assign aspect metadata 608 to selected elements of digital model 408 (e.g., elements of the imported CAD model 902, elements of robot models 302, or other elements of the automation system model 408). In this example, interface display 1102 comprises a main workspace 1106 on which is rendered a 3D graphical representation 1108 of the model 408 of an automation system being designed. Interface display 1102 can render an aspect toolbar 1104 above the main workspace 1106 in response to selection of a control aspect tab 1130. Aspect toolbar 1104 displays a number of selectable options representing control aspects—or categories of aspects—that can be selected and added to the model via interaction with the graphical representation 1108 (e.g., control panels, conveyors, dynamic joints, end effectors, kinematic joints, loads, motors, physics, physics geometry, physics groups, sensors, etc.).

In the example depicted in FIG. 11, a portion of the graphical representation 1108 representing a conveyor 1112 is to be labeled as with a "straight conveyor" aspect, identifying this component of the digital model 408 as a conveyor and associating simulation metadata with the representation of the conveyor 1112 which can be leveraged by simulation component 206 to accurately simulate the behavior of the conveyor 1112. To assign this aspect, a user can interact with the interface display 1102 to select a "straight conveyor" option from the Conveyor's drop-down selection 1132 in the aspect toolbar 1104, then select the representation of the conveyor 1112 in the graphical representation 1108 (the visualization of the digital model 408). In response to these selections an aspect metadata panel is rendered to the left of the main workspace 1106 listing a number of fields 1114-1126 for entering user-definable metadata values. These user-definable metadata values are in addition to the fixed, global aspect metadata values associated with the "straight conveyor" aspect, which are also associated with the conveyor 1112.

In general, the list of available user-definable aspect metadata values rendered by the user interface component 204 is based on the particular aspect selected. In this way, when a user assigns an aspect to a component of the digital model 408, user interface component 204 prompts the user to enter values of any user-defined metadata fields that may be available for that selected aspect. In the illustrated example, user-definable aspect metadata 608 for a conveyor can include definitions for a leading edge 1114 and a trailing edge 1116 of the conveyor 1112, which may be automatically identified by aspect metadata component 210 based on the shape of the mechanical conveyor representation to which the conveyor aspect is assigned, or may be explicitly identified by the user (e.g., by selecting the leading and trailing edges to indicate their locations). Additionally, the user interface component 204 may prompt the user to input such user-definable conveyor aspect metadata values as a running speed 1118, an acceleration 1120, or a deceleration 1122 of the conveyor. The user may also be prompted to specify a material 1124 of the belt used to convey products along the conveyor, which may impact the simulated traversal of products along the conveyor based on frictional coefficients or other physical properties of the material. A control mode 1126 for the conveyor 1112 may also be requested (e.g., on-off control, variable speed control, etc.).

Workflows and graphical interfaces similar to that illustrated FIG. 11 can be used to assign selected aspect metadata to other types of automation system components. According to another example, aspect metadata 608 for a pneumatic pusher arm may define a direction of linear movement of the pusher arm within the three-dimensional coordinate system of the digital model 408, a start position, and a range of movement. User interface component 204 may also prompt the user to provide user-defined metadata values for the velocity of the pusher's movement when actuated.

Some aspect definitions 222 (and corresponding aspect metadata 608 drawn from these definitions 222) may also define physical characteristics or constraints of selected mechanical components, and these characteristics and constraints can subsequently be referenced by simulation component 206 to accurately simulate the movement and behaviors of the components. These characteristics can include, but are not limited to, gear diameters, gear ratios, coefficients of friction, inertias, motion constraints (e.g., known axes of motion of a particular type of robot and their corresponding motion constraints), or other such data. Depending on the type of aspect, some of these aspect metadata values may be user-defined, while others may be fixed global characteristics that are expected to be applicable to all instances of the aspect. Some aspect definitions 222 may also define executable scripts that can be executed by simulation component 206 and applied to an associated element of the digital model 408 (e.g., an element labeled with the corresponding aspect by the user), causing the element to mimic the behavior of its corresponding physical component within the simulation environment.

Some aspect definitions 222 may also specify control I/O interfacing for their corresponding assets. For example, assigning aspect metadata 608 for a sensor (e.g., a photo-eye, a proximity switch, etc.) to a selected element of the digital model 408 representing a sensor can designate the selected element as a digital input device that provides a digital input value to an industrial controller in response to detection of an object within a detection range of the sensor. In this scenario, the detection range may be a user-defined aspect metadata value. In another example, aspect metadata 608 for a type of pusher arm may specify that the arm requires a digital controller output to control the advanced and retracted states of the pusher arm (e.g., ON for advanced and OFF for retracted), as well as two digital inputs to read the states of respective two proximity switches at the extreme ends of travel of the pusher arm to detect when the arm is in the fully advanced or fully retracted state. In general, aspect definitions 222 for system components having known or expected I/O interfacing to an industrial controller can define the inputs and/or outputs (analog and digital) required to monitor and/or control these system components. This I/O information can facilitate connectivity between the digital model 408 and an emulated controller when the model 408 is ready to be simulated by simulation component 206.

Figure 12:
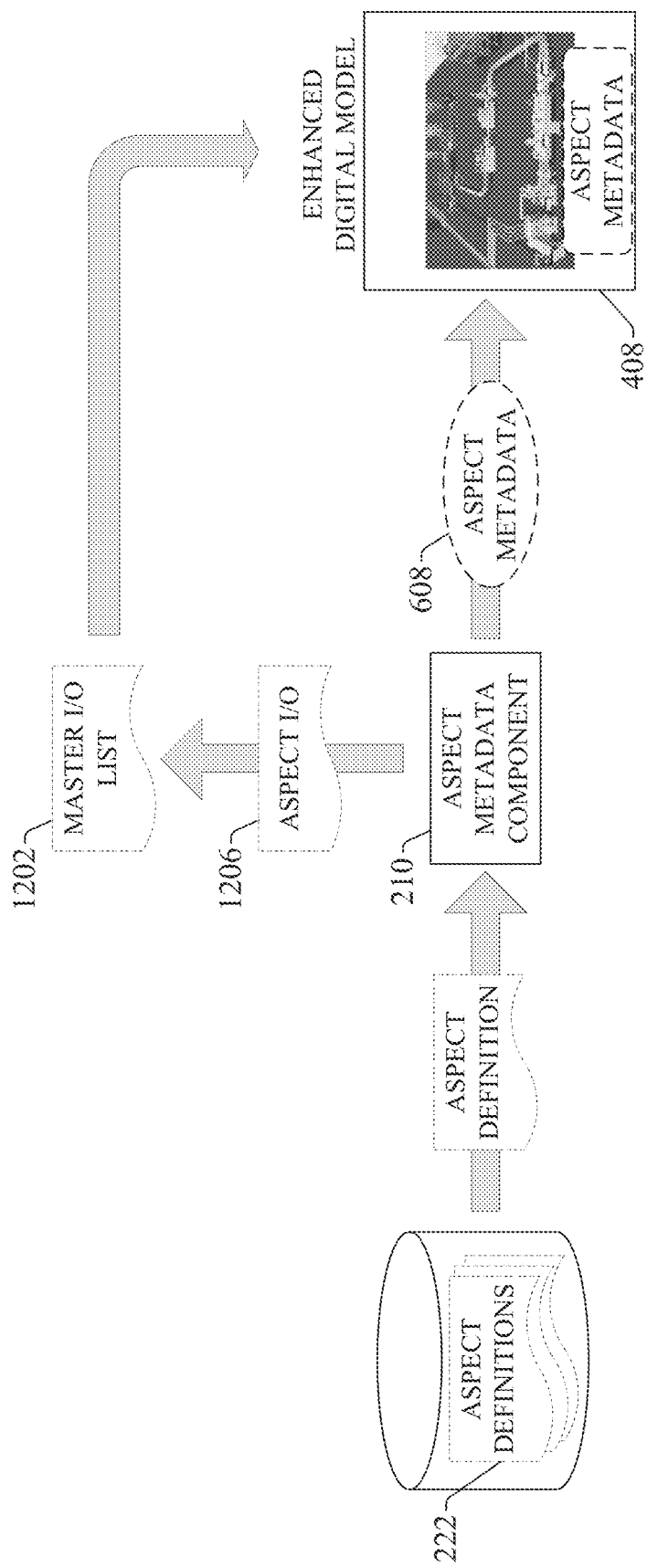
FIG. 12 is a diagram illustrating creation of a master I/O list for an automation system project based on assignment of aspect metadata to a digital model.

Moreover, in some embodiments, when aspects having associated I/O definitions are added to the digital model 408, aspect metadata component 210 can automatically populate an aggregate list of system I/O with the I/O points defined by the corresponding aspect definitions 222. FIG. 12 is a diagram illustrating creation of a master I/O list 1202 for an automation system project based on assignment of aspect metadata 608 to the digital model 408. When an aspect is selectively assigned to an element of the digital model 408 as described above, the aspect metadata component 210 determines whether the aspect definition 222 corresponding to the aspect defines inputs or outputs for the aspect. In addition to assigning the aspect metadata 608 to the digital model 408, any aspect I/O 1206 defined in the aspect definition 222 is added to a master I/O list 1202 for the automation system. This master I/O list 1202 can be rendered in a human-readable format and referenced by a designer in connection with designing the control system and associated control logic.

In some embodiments, the master I/O list 1202 can be integrated with or otherwise stored with the digital model 408 of the automation system, such that the I/O list 1202 travels with the model 408. Thus, the digital model 408 includes not only the 3D layout of the new automation system but also the I/O map for the entire system. This master I/O list 1202 can be generated before design of the control system begins in accordance with the designated aspect metadata 608, providing controls engineers with a useful design constraint (namely, the I/O required to operate the automation system).

In addition to the features described above, some embodiments of system 202 can support a wiring diagram manager that emulates a 2D representation of wiring between the industrial controller and the field hardware of the automation system (e.g., panel wiring, wiring harnesses, etc.). Typically, when simulating control of an automation system by an industrial controller, the I/O wiring between the controller and the field devices is not represented. Consequently, connectivity between the controller and field hardware, as represented by the wiring diagrams, cannot be verified until the system is commissioned.

To address this, the control design and testing system's wiring diagram manager can emulate a 2D representation of wiring between the controller and the field hardware. In such embodiments, simulation component 206 can simulate wiring diagrams to virtually confirm connectivity between the controller and I/O devices in the field (e.g., confirming that pressing start button on a control cabinet causes a conveyor to start). This approach can also confirm wiring connections that do not necessarily pass through the controller, or that are not wired directly to a controller tag (but rather connect to a device that interfaces to the controller), including but not limited to e-stops or other push buttons, switches, motors, etc.

The wiring diagram manager can allow a user to either draw wiring diagrams within the system 202 itself or to import wiring diagrams that were developed in other design tools (e.g., a CAD system), and to simulate data connectivity defined by the wiring diagrams within the context of the larger automation system simulation, confirming that signals are being routed properly through the wiring harnesses. For example, the system 202 can allow the user to create bindings by drawing connection arrows between I/O points, and animated connection arrows can visualize signal propagation through the system wiring, allowing the designer to confirm proper signal and power routing. To test signal paths, the user can interact with the 2D diagram to force values of connections, power sources, or signal sources and observe how the system responds.

Features of the control design and testing system 202 described herein can facilitate accurate simulation of industrial robots within a vendor-agnostic simulation platform using instances of the same robot programs—written using proprietary vendor-specific programming platforms—that will be installed on the physical robots. This can allow designers to import virtual models of robots that were developed using separate vendor-specific development platforms into a common vendor-agnostic platform and execute accurate simulations of the interactions of these disparate robots within a common virtual environment. Since the system 202 also allows a developer to create high fidelity simulations of the larger automation system context within which these robots will operate, interactions between the virtualized robots and other components of the automation system (including products or parts) are accurately simulated.

Figure 13:
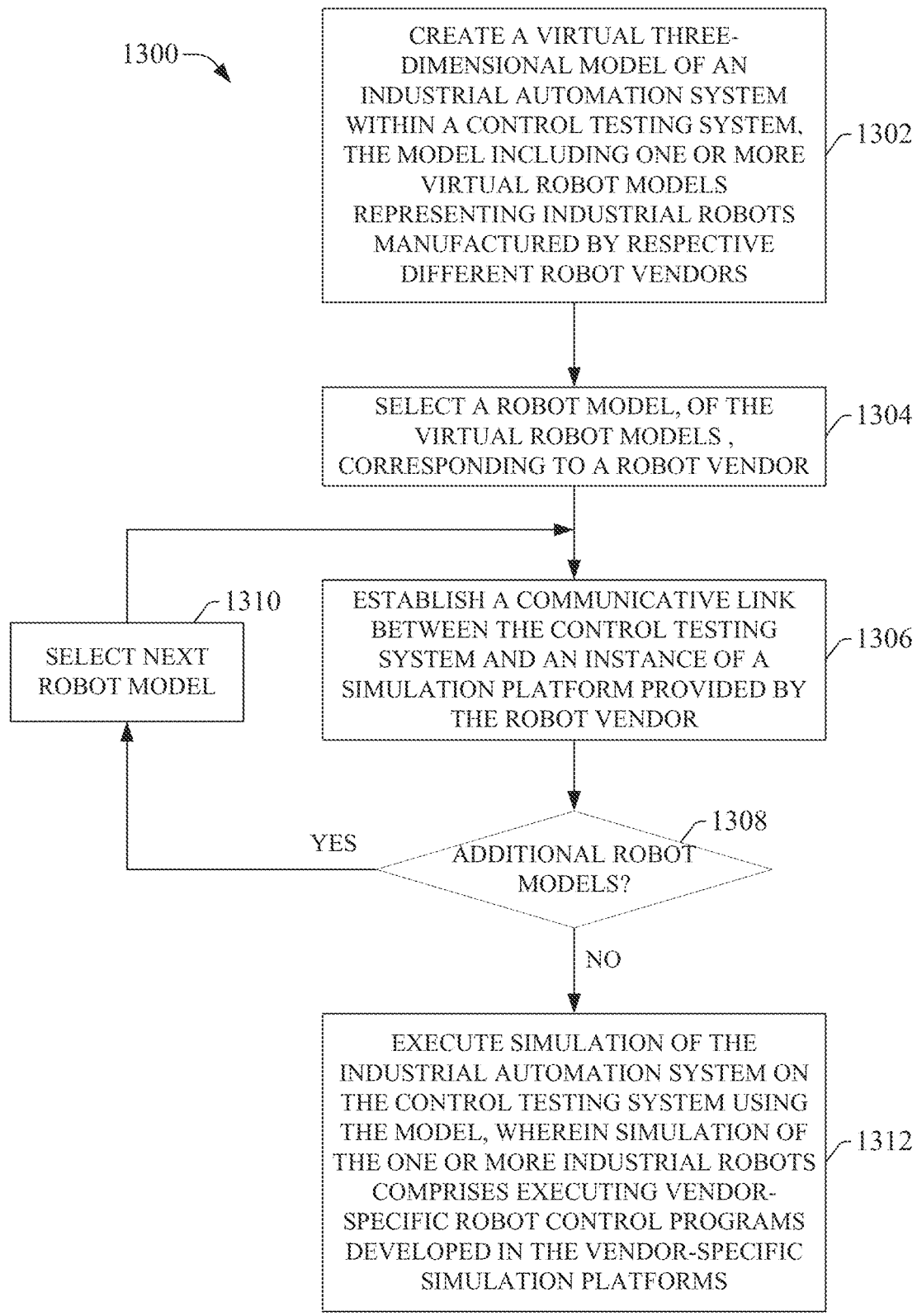
FIG. 13 is a flowchart of an example methodology for executing a simulation of an industrial automation system.

FIG. 13 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for executing a simulation of an industrial automation system. Initially, at 1302, a virtual three-dimensional model of an industrial automation system is created within a control testing system. The virtual model includes one or more virtual 3D models (e.g., digital twins or other types of digital models) of industrial robots to be included in the automation system, and which were manufactured by respective different robot vendors. At 1304, a robot model, of the virtual robot models, is selected. The robot model corresponds to a robot manufactured by a particular robot vendor.

At 1306, a communicative link is established between the control testing system and an instance of a simulation platform provided by the robot vendor. The simulation platform may be part of a vendor-specific robot configuration system used to generate a control program for the robot. At 1308, a determination as to whether the automation system model includes additional robot models that have not yet been linked to their corresponding vendor-specific simulation platforms. If there are additional robot models (YES at step 1308), the methodology proceeds to step 1310, where the next digital twin is selected, and step 1306 repeats for that robot model. Steps 1306-1310 repeat until all robot models have been linked to their corresponding vendor-specific simulation platforms.

At 1312, a simulation of the industrial automation system is executed on the control testing system using the model. Simulation of the one or more industrial robots comprises executing vendor-specific robot control programs developed in the corresponding vendor-specific simulation platforms. The robot programs—which are written in a proprietary language specific to the robot vendors—can be executed within the vendor-agnostic simulation environment of the control testing system using the communicative link to the vendor-specific simulation platforms.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
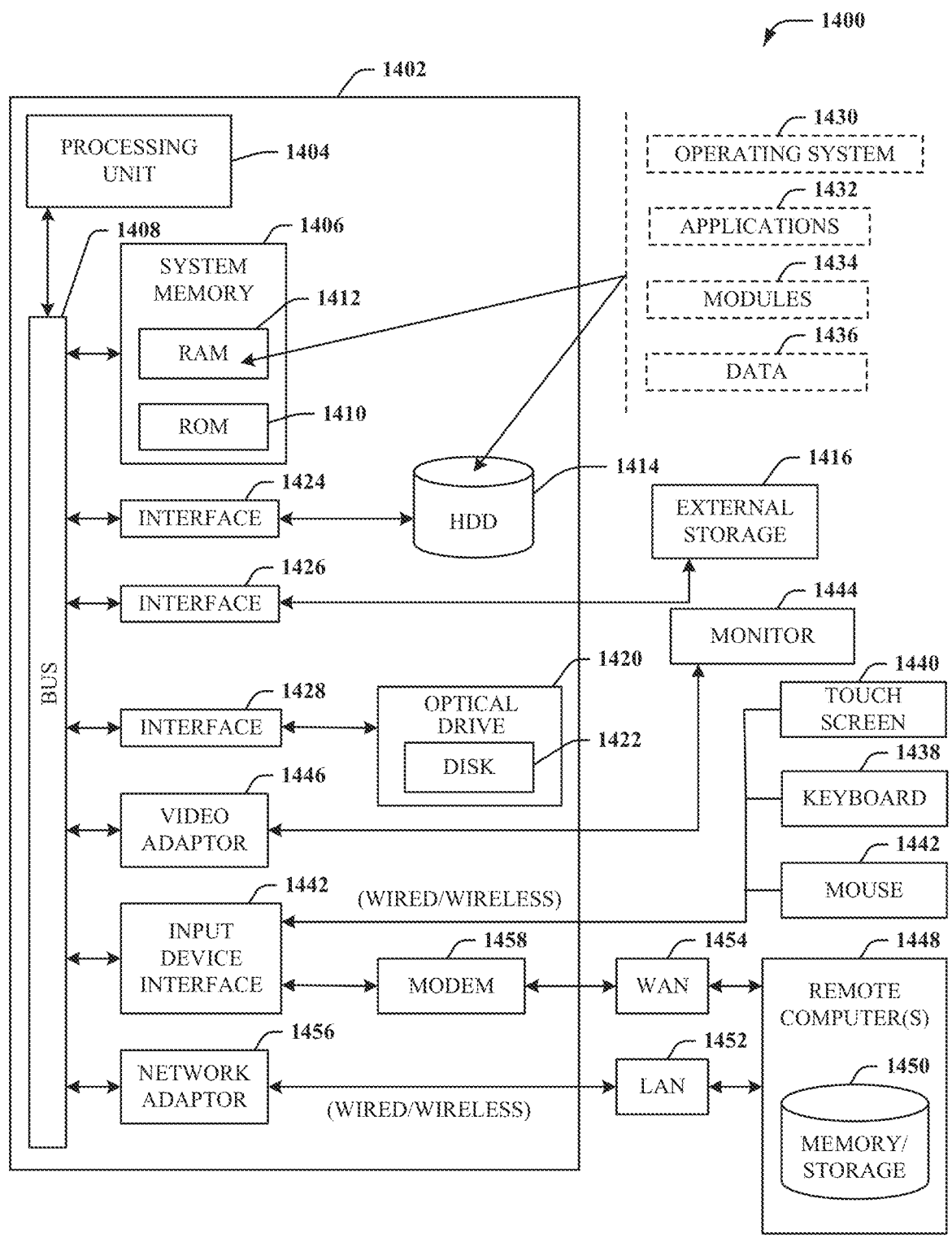
FIG. 14 is an example computing environment.
Figure 15:
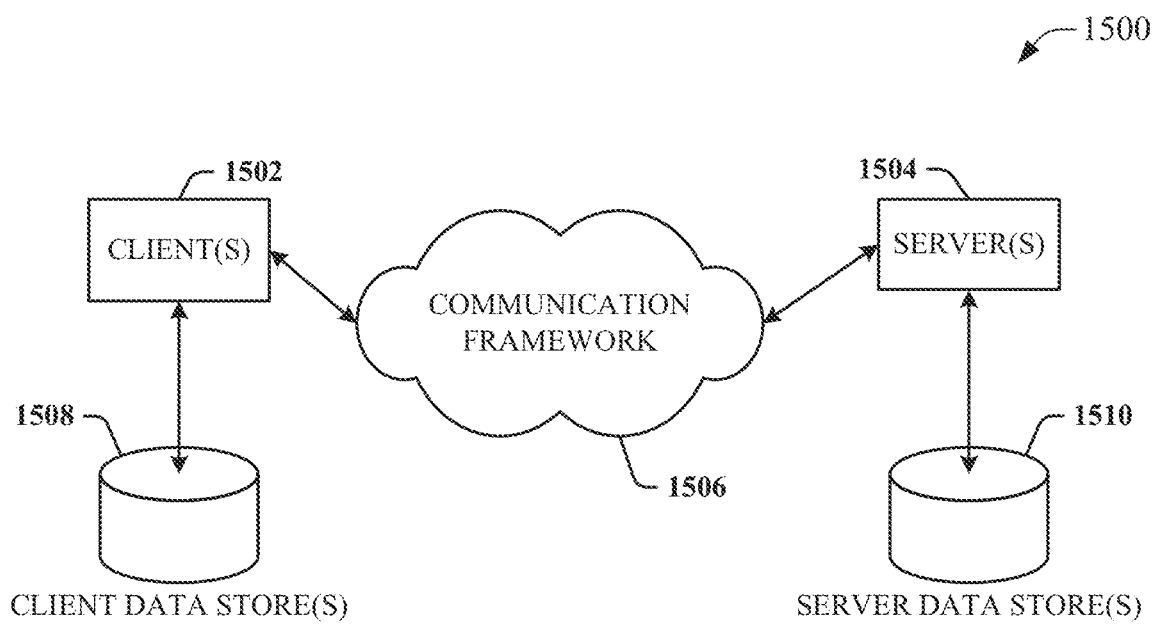
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14 In such an embodiment, operating system 1430 can comprise one virtual machine (VM) of multiple VMs hosted at computer 1402. Furthermore, operating system 1430 can provide runtime environments, such as the Java runtime environment or the .NET framework, for application programs 1432. Runtime environments are consistent execution environments that allow application programs 1432 to run on any operating system that includes the runtime environment. Similarly, operating system 1430 can support containers, and application programs 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1444 or other type of display device can be also connected to the system bus 1408 via an interface, such as a video adapter 1448. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the adapter 1456 in a wireless mode.

When used in a WAN networking environment, the computer 1402 can include a modem 1458 or can be connected to a communications server on the WAN 1454 via other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1452 or WAN 1454 e.g., by the adapter 1456 or modem 1458, respectively. Upon connecting the computer 1402 to an associated cloud storage system, the external storage interface 1426 can, with the aid of the adapter 1456 and/or modem 1458, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for simulating automation systems, comprising:
   a memory that stores executable components; and
   a processor, operatively coupled to the memory, that executes the executable components, the executable components comprising:
      a simulation component configured to execute, within a vendor-agnostic simulation platform, a simulation of an industrial automation system based on a three-dimensional virtual model of the industrial automation system;
      a model import component configured to import, into the simulation from a vendor-specific simulation platform, a virtual robot model representing an industrial robot and a robot program to be executed by the industrial robot, wherein the robot program is written in a vendor-specific format; and
      a user interface component configured to render the simulation on a client device,
      wherein the simulation component is configured to establish a link to the vendor-specific simulation platform and to access, via the link, vendor-specific execution resources available on the vendor-specific simulation platform in connection with executing the robot program within the vendor-agnostic simulation platform.

2. The system of claim 1, further comprising a controller emulation component configured to emulate execution of an industrial control program by a virtualized industrial controller,
   wherein the simulation component is configured to simulate operation of the industrial automation system under control of the industrial control program.

3. The system of claim 1, further comprising an aspect metadata component configured to assign aspect metadata to selected elements of the virtual model in accordance with aspect specification input data, the aspect metadata defining simulation behaviors of the selected elements to be simulated by the simulation component.

4. The system of claim 3, wherein
   at least one of the selected elements is an end effector of the virtual robot model, and
   a subset of the aspect metadata assigned to the end effector specifies a type of the end effector and physical properties associated with the type of the end effector.

5. The system of claim 4, wherein the type of the end effector is one of a suction gripper or a mechanical gripper.

6. The system of claim 3, wherein
   the user interface component is configured to receive the aspect specification input data via interaction with a graphical interface display rendered by the user interface component,
   the graphical interface display comprises a toolbar that renders a set of aspects available for selection and assignment to the selected elements, and
   the aspect specification input data selects an aspect from the set of the aspects and indicates an element, of the selected elements, to which the aspect is to be assigned.

7. The system of claim 6, wherein the available aspects comprise at least one of a slider joint, a revolute joint, a robot arm joint, a hinge, a conveyor, a suction gripper, a mechanical gripper, a sensor, a pneumatic actuator, a hydraulic actuator, a pusher arm, a stopper, or a roller.

8. The system of claim 1, wherein the vendor-specific execution resource is at least one of a proprietary execution algorithm, a proprietary library, or a proprietary operating system.

9. The system of claim 1, wherein the simulation component is configured to execute the simulation at a faster-than-real-time speed determined by a time base specified via user input.

10. A method for simulating an industrial automation system, comprising:
    importing, from a vendor-specific simulation platform by a simulation system comprising a processor, a virtual robot model representing an industrial robot and a robot program to be executed by the industrial robot into a vendor-agnostic simulation platform, wherein the robot program is written in a vendor-specific format; and
    executing, by the simulation system within the vendor-agnostic simulation platform, a simulation of an industrial automation system based on a three-dimensional virtual model of the industrial automation system, wherein the three-dimensional virtual model includes the virtual robot model, and wherein the executing comprises:
       establishing a communicative link between the vendor-agnostic simulation platform and the vendor-specific simulation platform,
       accessing, via the link, vendor-specific resources available on the vendor-specific simulation platform in connection with executing the robot program locally within the vendor-agnostic simulation platform, and
       simulating operation of the industrial robot under control of the robot program based on the accessing; and
    rendering, by the simulation system, the simulation on a client device.

11. The method of claim 10, further comprising emulating, by the simulation system, execution of an industrial control program on a virtual industrial controller, wherein the executing the simulation comprises simulating operation of the industrial automation system under control of the industrial control program.

12. The method of claim 10, further comprising:
    receiving, by the simulation system, aspect specification input data that tags selected components of the virtual model as being specified aspects of the industrial automation system; and assigning, by the simulation system, aspect metadata to the selected components based on the aspect input data, the aspect metadata defining simulation behaviors of the selected components.

13. The method of claim 12, wherein the assigning the aspect metadata comprises assigning a subset of the aspect metadata to an end effector of the virtual robot model, the subset of the aspect metadata specifying a type of the end effector and physical properties associated with the type of the end effector.

14. The method of claim 13, wherein the type of the end effector is one of a suction gripper or a mechanical gripper.

15. The method of claim 10, wherein the accessing comprises accessing at least one of a proprietary execution algorithm, a proprietary library, or a proprietary operating system.

16. The method of claim 10, wherein the executing of the simulation further comprises executing the simulation at a faster-than-real-time speed determined by a time base specified via user input.

17. A non-transitory computer-readable medium having stored thereon instructions that, in response to execution, cause a system comprising a processor to perform operations, the operations comprising:
  importing, from a vendor-specific simulation platform into a vendor-agnostic simulation platform, a virtual robot model representing an industrial robot and a robot program to be executed by the industrial robot, wherein the robot program is written in a vendor-specific format;
  simulating operation of an industrial automation system modeled by a three-dimensional virtual model, wherein the three-dimensional virtual model includes the digital robot model of an industrial robot, and wherein the simulating comprises:
    establishing a communicative link connecting the vendor-agnostic simulation platform to an instance of the vendor-specific simulation platform,
    accessing, via the link, vendor-specific resources available on the vendor-specific simulation platform,
    executing the robot program locally within the vendor-agnostic simulation platform using the vendor-specific resources, and
    simulating operation of the industrial robot under control of the robot program based on the executing of the robot program.

18. The non-transitory computer-readable medium of claim 17, wherein the accessing comprises accessing at least one of a proprietary execution algorithm, a proprietary library, or a proprietary operating system.

19. The non-transitory computer-readable medium of claim 17, wherein the simulating further comprises:
  emulating execution of an industrial control program on a virtual industrial controller, and
  simulating operation of the industrial automation system under control of the industrial control program.

20. The non-transitory computer-readable medium of claim 17, wherein the simulating further comprises executing the simulation at a faster-than-real-time speed determined by a time base specified via user input.

* * * * *